US012630472B2

(12) United States Patent
Li et al.

(10) Patent No.: US 12,630,472 B2
(45) Date of Patent: May 19, 2026

(54) COATED GLASS SUBSTRATE OR GLASS CERAMIC SUBSTRATE WITH RESISTANT MULTIFUNCTIONAL SURFACE PROPERTIES, METHOD FOR PRODUCTION THEREOF, AND USE OF THEREOF

(71) Applicant: Schott AG, Mainz (DE)

(72) Inventors: Yigang Li, Shanghai (CN); Guangjun Zhang, Shanghai (CN); José Zimmer, Losheim am See (DE); Jochen Alkemper, Klein-Winterheim (DE); Marta Krzyzak, Bad Gandersheim (DE); Marten Walther, Alfeld (DE)

(73) Assignee: Schott AG, Mainz (DE)

( * ) Notice: Subject to any disclaimer, the term of this patent is extended or adjusted under 35 U.S.C. 154(b) by 343 days.

(21) Appl. No.: 17/237,380

(22) Filed: Apr. 22, 2021

(65) Prior Publication Data

US 2021/0238085 A1 Aug. 5, 2021

Related U.S. Application Data

(63) Continuation of application No. 15/454,712, filed on Mar. 9, 2017, now abandoned, which is a (Continued)

(30) Foreign Application Priority Data

Sep. 12, 2014 (DE) ..................... 10 2014 013 528.4

(51) Int. Cl.
*C03C 17/42* (2006.01)
*C03C 3/062* (2006.01)
(Continued)

(52) U.S. Cl.
CPC .............. *C03C 17/42* (2013.01); *C03C 3/062* (2013.01); *C03C 3/064* (2013.01); *C03C 3/066* (2013.01);
(Continued)

(58) Field of Classification Search
CPC ..... G02B 1/11–118; G02B 1/115; C03C 3/04; C03C 3/087; C03C 3/045; C03C 3/076;
(Continued)

(56) References Cited

U.S. PATENT DOCUMENTS 3,778,335 A 12/1973 Boyd
5,847,876 A 12/1998 Ferrante et al.
(Continued)

FOREIGN PATENT DOCUMENTS

CN 102923966 2/2013
CN 102923969 A 2/2013
(Continued)

OTHER PUBLICATIONS

JP2002-179437A English translation JPlatPat (Year: 2002).*
(Continued)

*Primary Examiner* — Frank J Vineis
*Assistant Examiner* — Laura B Figg
(74) *Attorney, Agent, or Firm* — TAYLOR & EDELSTEIN, PC

(57) ABSTRACT

The invention relates to a coated glass substrate or glass ceramic substrate with resistant, multi-functional surface properties, including a combination of anti-microbial, anti-reflective and anti-fingerprint properties, or a combination of anti-microbial, anti-reflective and anti-fingerprint properties where the substrate is chemically pre-stressed, or a combination of anti-microbial and anti-reflective properties where the substrate is chemically pre-stressed. The coated glass substrate or glass ceramic substrate exhibits a unique combination of functions which are permanently present and do not exert a negative effect on each other.

22 Claims, 7 Drawing Sheets

Related U.S. Application Data continuation of application No. PCT/EP2015/068613, filed on Aug. 13, 2015.

(51) Int. Cl.

| | |
|---|---|
| *C03C 3/064* | (2006.01) |
| *C03C 3/066* | (2006.01) |
| *C03C 3/068* | (2006.01) |
| *C03C 3/07* | (2006.01) |
| *C03C 3/072* | (2006.01) |
| *C03C 3/074* | (2006.01) |
| *C03C 3/078* | (2006.01) |
| *C03C 3/083* | (2006.01) |
| *C03C 3/085* | (2006.01) |
| *C03C 3/087* | (2006.01) |
| *C03C 3/089* | (2006.01) |
| *C03C 3/091* | (2006.01) |
| *C03C 3/093* | (2006.01) |
| *C03C 3/095* | (2006.01) |
| *C03C 3/097* | (2006.01) |
| *C03C 3/102* | (2006.01) |
| *C03C 3/105* | (2006.01) |
| *C03C 3/108* | (2006.01) |
| *C03C 3/112* | (2006.01) |
| *C03C 3/118* | (2006.01) |
| *C03C 4/02* | (2006.01) |
| *C03C 4/18* | (2006.01) |
| *C03C 10/00* | (2006.01) |
| *C03C 21/00* | (2006.01) |
| *C09D 5/00* | (2006.01) |
| *C09D 5/14* | (2006.01) |

(52) U.S. Cl.

CPC ............... *C03C 3/068* (2013.01); *C03C 3/07* (2013.01); *C03C 3/072* (2013.01); *C03C 3/074* (2013.01); *C03C 3/0745* (2013.01); *C03C 3/078* (2013.01); *C03C 3/083* (2013.01); *C03C 3/085* (2013.01); *C03C 3/087* (2013.01); *C03C 3/089* (2013.01); *C03C 3/091* (2013.01); *C03C 3/093* (2013.01); *C03C 3/095* (2013.01); *C03C 3/097* (2013.01); *C03C 3/102* (2013.01); *C03C 3/105* (2013.01); *C03C 3/108* (2013.01); *C03C 3/112* (2013.01); *C03C 3/118* (2013.01); *C03C 4/02* (2013.01); *C03C 4/18* (2013.01); *C03C 10/0027* (2013.01); *C03C 10/0054* (2013.01); *C03C 21/002* (2013.01); *C03C 21/005* (2013.01); *C09D 5/006* (2013.01); *C09D 5/14* (2013.01); *C03C 2204/00* (2013.01); *C03C 2204/02* (2013.01); *C03C 2204/04* (2013.01); *C03C 2217/732* (2013.01); *C03C 2217/734* (2013.01); *C03C 2217/76* (2013.01); *C03C 2218/113* (2013.01); *G02F 2201/50* (2013.01)

(58) Field of Classification Search

CPC . C03C 10/0027; C03C 10/0054; C03C 17/42; C03C 21/002; C03C 21/005; C03C 3/062; C03C 3/064; C03C 3/066; C03C 3/068; C03C 3/07; C03C 3/072; C03C 3/074; C03C 3/0745; C03C 3/078; C03C 3/083; C03C 3/085; C03C 3/089; C03C 3/091; C03C 3/093; C03C 3/095; C03C 3/097; C03C 3/102; C03C 3/105; C03C 3/108; C03C 3/112; C03C 3/118; C03C 4/02; C03C 4/18; C03C 2204/00; C03C 2204/02; C03C 2204/04; C03C 2217/732; C03C 2217/734; C03C 2217/76; C03C 2218/113; C03C 17/3417; C03C 17/3429;

C09D 5/006; C09D 5/14; G02F 2201/50; C23C 18/1212; C23C 18/1225; C23C 18/1245; C23C 18/1254; C23C 28/04; Y10T 428/249969; Y10T 428/265

See application file for complete search history.

(56) References Cited

U.S. PATENT DOCUMENTS

| | | | |
|---|---|---|---|
| 6,333,285 B1 | 12/2001 | Chopinet et al. | |
| 6,391,462 B1 | 5/2002 | Jang | |
| 6,921,546 B2 | 7/2005 | Albach | |
| 10,155,361 B2 | 12/2018 | Bookbinder et al. | |
| 2007/0172661 A1 | 7/2007 | Fechner et al. | |
| 2008/0145625 A1 | 6/2008 | Schumacher et al. | |
| 2009/0162695 A1 | 6/2009 | Hevesi et al. | |
| 2009/0197048 A1 | 8/2009 | Amin et al. | |
| 2010/0246016 A1 | 9/2010 | Carlson et al. | |
| 2010/0263525 A1* | 10/2010 | Siebers | B32B 27/06 |
| | | | 89/917 |
| 2010/0279068 A1 | 11/2010 | Cook et al. | |
| 2010/0285272 A1 | 11/2010 | Koval et al. | |
| 2011/0052815 A1 | 3/2011 | Fritsche et al. | |
| 2012/0034435 A1 | 2/2012 | Borrelli et al. | |
| 2012/0135848 A1* | 5/2012 | Beall | C03C 10/0054 |
| | | | 65/30.14 |
| 2012/0157290 A1 | 6/2012 | Gabel et al. | |
| 2012/0219792 A1* | 8/2012 | Yamamoto | C03C 21/005 |
| | | | 65/30.14 |
| 2013/0202715 A1 | 8/2013 | Wang et al. | |
| 2013/0224493 A1* | 8/2013 | Gabel | C03B 32/02 |
| | | | 65/33.1 |
| 2014/0017462 A1 | 1/2014 | Borrelli et al. | |
| 2014/0147654 A1* | 5/2014 | Walther | C23C 18/1212 |
| | | | 428/448 |
| 2014/0356605 A1 | 12/2014 | Adib et al. | |
| 2015/0044482 A1 | 2/2015 | Lee et al. | |
| 2015/0299035 A1 | 10/2015 | Kuksenkov | |

FOREIGN PATENT DOCUMENTS

| | | | | |
|---|---|---|---|---|
| CN | 103013189 A | 4/2013 | | |
| DE | 198 48 591 A1 | 10/1999 | | |
| DE | 10 2007 009 785 A1 | 8/2008 | | |
| DE | 102018122020 B3 * | 2/2020 | | |
| EP | 0 844 265 A1 | 5/1998 | | |
| EP | 1 123 906 B1 | 8/2001 | | |
| EP | 2 103 965 A1 | 9/2009 | | |
| JP | 2002179437 A * | 6/2002 | ......... | C03C 10/0027 |
| JP | 2011-133800 A | 7/2011 | | |
| WO | 2007/108514 A1 | 9/2007 | | |
| WO | 2007/147842 A2 | 12/2007 | | |
| WO | 2008/099061 A1 | 8/2008 | | |
| WO | 2011/120656 A1 | 10/2011 | | |
| WO | 2011149694 A1 | 12/2011 | | |
| WO | 2012/163947 A1 | 12/2012 | | |
| WO | WO-2012163946 A1 * | 12/2012 | ......... | C23C 18/1212 |
| WO | 2014/124348 A1 | 8/2014 | | |

OTHER PUBLICATIONS

English translation from Search of DE-102018122020 (Year: 2018).*

Notice of Transmission of the International Research Report and the Written Notice Issued the International Searching Authority or Declaration dated Nov. 9, 2015 for International Application No. PCT/EP2015/068613 (11 pages).

P. Löbmann, "Sol-Gel Coatings", Advanced Training Course 2003, Surface Processing of Glass—Hüttentechnische Vereinigung der deutschen Glasindustrie (Research Association of the German Glass Industry) (5 pages).

C. Brinker, G. Scherer, "Sol-Gel-Science—the Physics and Chemistry of Sol-Gel Processing" (Academic Press, Boston 1990), R. Iller, The Chemistry of Silica (Wiley, New York, 1979) (68 pages).

(56) References Cited

OTHER PUBLICATIONS

Notification of Transmittal of Translation of the International Preliminary Report on Patentability dated Mar. 16, 2017 for International Application No. PCT/EP2015/068613 (10 pages).
English translation of a Taiwan Office Action dated Jan. 8, 2019 for Taiwan Application No. 01178/10820019720 (6 pages).
Translation of the Japanese Office Action dated Jul. 8, 2019 for Japanese Patent Application No. 2017-513710 (9 pages).
Japanese Office Action dated Oct. 5, 2020 for Japanese Patent Application No. 2017-51370 (4 pages).
English translation of Japanese Office Action dated Oct. 5, 2020 for Japanese Patent Application No. 2017-51370 (5 pages).
"Touchscreen surface warfare—Physics and chemistry of antimicrobial behavior of ion-exchanged silver in glass", C. Kosik Williams et al., American Ceramic Society Bulletin, vol. 93(4), pp. 20-24, May 2014 (6 pages).
"Functionalisation of the template-free and template-structured silica films by synthesised on glass substrates by sol-gel technique", Tetyana Levchenko, Yuri Plyuto and Nina Kovtyukhova, Journal of Sol-Gel Science and Technology, vol. 43, p. 269-274, Jun. 3, 2007 (6 pages).
Williams et al. "Touchscreen surface warfare—Physics and chemistry of antimicrobial behavior of ion-exchanged silver in glass", American Ceramic Society Bulletin, vol. 93, No. 4 pp. 20-25, published May 1, 2014 (Year: 2014).

\* cited by examiner

COATED GLASS SUBSTRATE OR GLASS CERAMIC SUBSTRATE WITH RESISTANT MULTIFUNCTIONAL SURFACE PROPERTIES, METHOD FOR PRODUCTION THEREOF, AND USE OF THEREOF

CROSS REFERENCE TO RELATED APPLICATIONS

This is a continuation of U.S. patent application Ser. No. 15/454,712, entitled "COATED GLASS SUBSTRATE OR GLASS CERAMIC SUBSTRATE WITH RESISTANT MULTIFUNCTIONAL SURFACE PROPERTIES, METHOD FOR PRODUCTION THEREOF, AND USE OF THEREOF," filed Mar. 9, 2017, which is incorporated herein by reference. U.S. patent application Ser. No. 15/454,712 is a continuation of PCT application No. PCT/EP2015/068613, entitled "COATED GLASS SUBSTRATE OR GLASS CERAMIC SUBSTRATE WITH RESISTANT MULTIFUNCTIONAL SURFACE PROPERTIES, METHOD FOR PRODUCTION THEREOF, AND USE OF THEREOF", filed Aug. 13, 2015, which is incorporated herein by reference.

BACKGROUND OF THE INVENTION

1. Field of the Invention

The present invention relates to a coated glass substrate or glass ceramic substrate with resistant—in other words—permanently present multifunctional properties, a method for production thereof, as well as use thereof.

2. Description of the Related Art

Glass, due to its special properties such as excellent mechanical strength and durability against chemicals, is one of the most utilized materials worldwide and can be produced relatively cost effectively. Glasses are used almost everywhere such as in the construction industry, in the electronic field, in transportation, in consumer goods for daily requirements, in laboratory applications, in research equipment, etc. In such varied fields of application, the respectively used glass properties are also very different. Construction glass, for example, should possess high mechanical strength. Glass that is used in the medical field or in areas that are accessible to the public should possess antimicrobial properties. Window glass or glass in display devices should have high transparency and high antireflective properties. For so-called touch screens, display windows or glass exhibition spaces, it is advantageous if these possess anti-fingerprint properties or so-called easy-to-clean properties. In many cases, it is not absolutely necessary to develop new glasses to meet each of the aforementioned requirements. The desired functions are normally only properties of the glass surface, so that over time many surface treatments and coating methods were developed to provide new functions to known glass products.

For example, numerous disclosures have become known from the state of the art for antimicrobial (AM-) glass surfaces.

Documents US 2007/0172661 A1, JP 2011-133800A and US 2012/0034435 A1 describe various methods to provide antimicrobial properties to the glass surface, for example, by means of the silver alkali ion exchange technology. According to this state of the art, an ion exchange—normally sodium ions—occurs between silver ions and the alkali ions contained in the glass so that the silver ions diffuse into the glass surface and are preset at a depth of several hundred nanometers to several tens of micrometers. Silver ions have a well-known cytotoxic effect upon microorganisms, ranging from inhibition of their growth to cell death.

Antimicrobial glass surface can also be produced with other technologies. In principle, all types of known antimicrobial agents, in particular metals such as silver or copper, metal alloys such as silver salts or nanoparticles of complex organic compounds can be deposited on glass surfaces as antimicrobial coatings. Antimicrobial glass surfaces can also be produced by using thermal tempering methods.

US 2008/0145625 A1 describes, for example, a method for producing a glass substrate having a Sol-Gel coating, wherein a silver-containing antimicrobial Sol-Gel coating can be applied.

US 2014/0017462 A1 describes a transparent and antimicrobial cover glass containing nanoparticles of Cu or $Cu_2O$ on the surface of the glass, as well as a method for producing these glass objects.

US 2009/0162695 A1 describes a method for the production of a substrate having antimicrobial properties, comprising depositing of a mixed layer on a substrate by sputtering under vacuum, the mixed layer containing at least one antimicrobial agent and one binding agent.

WO 2007/108514 A1 describes a glass plate with an antibacterial film.

U.S. Pat. No. 6,921,546 B2 describes a glass or glass-like substrate with antimicrobial effect. The antimicrobial substrate is produced be providing a metal ion precursor comprising at least one source for antimicrobial metal ions, dissolved or otherwise dispersed in a carrier material; depositing of the precursor onto at least one surface of the substrate; drying of the substrate at a temperature of approximately 20° C. to approximately 105° C.; removal of the volatile components from the metal ion precursor and heating the resulting substrate to a temperature of approximately 600° C. to approximately 650° C. for 2 to 5 minutes in order to exchange or otherwise implant the antimicrobial metallic ions from the precursor into the glass or glass-like substrate.

WO 2007/147842 describes a method to produce a substrate with antimicrobial properties, wherein a metal layer comprising an inorganic antimicrobial agent is applied and the agent is diffused into a least one surface of the substrate that is subjected to a thermal treatment. Alternatively, the substrate can initially be coated with a base layer, whereby the diffusion then occurs in the base layer.

US 2012/0219792 A1 describes a glass substrate as a cover glass for a display device that not only has excellent strength and antibacterial properties, but also high transparency and high visible transmittance. The method comprises chemical prestressing of the glass substrate in an at least $KNO_3$-containing molten salt, cleaning of the glass substrate, forming of a silver film on the surface of the cleaned substrate, subjecting the glass substrate with the silver film that is formed thereupon to a heat treatment in order to allow diffusion of the silver ions from the glass substrate surface into the interior, as well as washing and removal from the glass substrate of the non-diffused silver remaining on the surface.

To provide a glass surface with anti-reflective (AR-) properties, an AR-coating is the conventional choice. AR-coating is a type of optical coating that is applied to the surface to reduce reflection and to thereby improve light transmission in a specific wavelength range. IR-, visible or UV-frequencies are frequently selected.

The simplest interference AR-coating consists of a single quarter wave layer of transparent material whose refractive index is the square root of the refractive index of the substrate. This results, theoretically, in a zero reflection in the center of the wavelength and reduces the reflection for wavelengths in a broader band around the center. AR-coatings in the form of multi-layers consist, for example, of transparent thin film structures with alternating layers of opposing refractive indexes. The layer thicknesses are selected to produce a destructive interference in the rays that are reflected by the boundary surfaces, and a constructive interference in the accordingly transmitted rays. AT-coatings are used in a wide range of applications where light passes through an optical surface and where small losses or low reflection is desired.

According to the interference mechanism in AR-coatings, any known coating can in principle be used as anti-reflective coating as long as its refractive index is suitable. The coating can be applied by liquid phase coating, for example by print technology, spray technology or a Sol-Gel method. The anti-reflective coating can also be applied by a CVD-coating, for example a PECVD-, PICVD-, low pressure CVD- or chemical vapor deposition at atmospheric pressure. The anti-reflective coating can also be applied with a PVD-coating, for example through sputtering, thermal evaporation, laser beam-, electron beam- or arc-evaporation.

Numerous suggestions for anti-reflective coatings have become known from the state of the art:

U.S. Pat. No. 5,847,876 describes an anti-reflective layer, applied onto a glass substrate that describes a first layer having a high refractive index, preferably consisting of $Al_2O_3$, and a second layer having a low refractive index, preferably consisting of $MgF_2$.

EP 2 103 965 A1 describes an anti-reflective layer, applied onto a substrate of glass or plastic. The first layer with high refractive index includes an oxide of at least one of the following elements: tin, gallium, or cerium as well as indium oxide; the second layer consists of a metal such as silver and palladium; the third layer is consistent with the first layer with high refractive index and the fourth and uppermost layer has a low refractive index and consists of silicon dioxide, magnesium fluoride or potassium fluoride. The layers in each case are applied through sputtering.

US 2011/0052815 A1 describes a composition for producing an AR-coating comprising a condensate of silicon compounds of the general formula $R_nSiX_{4-n}$, wherein the X-groups are equal or different and represent hydrolysable groups or hydroxyl groups, wherein the R-groups are equal or different and represent non-hydrolysable groups, and whereby n is 0, 1, 2 or 3 and whereby the composition includes at least one polymeric agent for control of the rheology, and at least one solvent with a boiling point of at least 150° C. This document also describes the method for production and use of the current composition. The composition can, in particular, be applied onto the substrates by method of screen printing.

CN 102923969 A describes a double function in the form of anti-reflective and oleophobic coated glass as well as its production process. The film structure of the coated glass is as follows: a glass substrate, a base film, a buffer film and a surface film, whereby the base film contains a silicon-fluoride compound and the surface film comprise a fluorine silicon organic compound. The films are applied predominantly through spray technology.

CN 103013189 A describes an anti-reflective glass coating liquid, produced by silicon-oxide solution that is applied onto the surface of the glass by a roll coating method, immersion coating or spray method and a tempering treatment that is implemented at temperatures of no more than 100° C.

WO 2008/099061 A1 describes a method for coating an optical product, including AR-coating which is applied by chemical vapor deposition (CVD).

An anti-fingerprint (AF) surface, that is sometimes also referred to as easy-to-clean (ETC) or amphiphobic surface, ensures that impurities or contaminations as a result of fingerprints are largely not visible and thus the surface being used appears clean even without being cleaned. The AF surface must be resistant to water, salts and fat residues that, for example, originate from the fingerprints of the user and are deposited on the surface. The wetting properties of an AF surface must be hydrophobic as well as oleophobic.

The majority of the known AF coatings are based essentially on organofluoride compounds with a high water contact angle. In some cases, specially designed structures are produced on the glass surface to further increase the contact angle with oil and water.

From the state of the art regarding AF surfaces of glass objects, the following documents have for example become known:

To produce a protective layer of this type, DE 198 48 591 A1 describes the use of organofluorine compounds of the $R_f$—V formula in the form of a liquid system, comprising the organofluorine compound in a carrier fluid, whereby $R_f$ in the formula represents an aliphatic hydrocarbon residue that partially or completely fluorinates and is straight-chained, branched or cyclic. The hydrocarbon radicals can also be interrupted by one or more oxygen, nitrogen or sulfur atoms. V represents a polar or dipolar group, selected from —COOR, —COR, —COF, —CH$_2$OR, —OCOR, —CONR$_2$, —CN, —CONH—NR$_2$, —CON=C(NH$_2$)$_2$, —CH=NOR, —NRCONR$_2$, —NR$_2$COR, NR$_w$, —SO$_3$R, —OSO$_2$R, OH, —SH, —B, —OP(OH)$_2$, —OPO(OH)$_2$, —OP(ONH$_4$)$_2$, —OPO(ONH$_4$)$_2$, —CO—CH=CH$_2$, wherein R in a group V can be the same or different and for hydrogen represents a phenyl radical, a straight-chain or branched alkyl- or alkyl ether radical with up to 12, preferably up to 8 carbon atoms which may be partially or completely fluorinated or chlorofluorinated, and w is 2 or 3, or is —R$_v$—V—. In the formula —R$_v$—V—, V stands for the aforementioned polar or dipolar group and R$_v$ represents a straight-chain or branched alkyl radical with up to 12, preferably up to 8 carbon atoms which may be partially or completely fluorinated or chlorofluorinated.

EP 0844 265 A1 describes a silicon containing fluoropolymer for coating of substrate surfaces, consisting, for example, of metal, glass and plastic materials, to provide a surface with sufficient and long lasting antifoul properties, sufficient weather resistance, slipperiness, anti-adhesion properties, water-repellant properties and resistance against oily contaminants and fingerprints. Also disclosed is a solution for a surface treatment method comprising a silicon-containing organic fluoropolymer, a fluoric organic solvent, as well as a silane compound.

US 2010/0279068 A1 describes a method for providing hydrophobic and oleophobic glass surfaces. The method consists of heating glass particles to temperatures close to the glass softening point and pressing of a structured shape into the glass article to obtain a surface texture.

US 2010/0285272 A1 describes a glass substrate with at least one treated surface that is hydrophobic and oleophobic, has anti-adhesion properties, is fingerprint repelling, durable and transparent. The surface has at least one type of topological features that, with a special geometry, prevents the decrease of the contact angle and adhesion of water and oil drops. For application of an AF-coating, the glass surface can, for example, be sand blasted and the coating be applied by physical or chemical vapor deposition.

US 2009/0197048 A1 describes an AF- or easy-to-clean coating on a glass cover that has an outer coating consisting of fluorine end groups such as perfluorocarbon residues or a perfluorocarbon-containing residue, thus making the glass cover hydrophobic and oleophobic, thus minimizing wetting of the glass surface with water and oils. Underneath the AF-coating, an AR-coating may be present that is comprised of silicon dioxide, quartz glass, fluorine doped silicon dioxide, fluorine doped quartz glass, $MgF_2$, $HfO_2$, $TiO_2$, $ZeO_2$, $Y_2O_3$ or $Gd_2O_3$. Prior to AF-coating, a pattern or a structure can be deposited or applied to the glass surface, wherein an etching process, lithographic process or particle coating process is used. The glass cover can be etched after the ion exchange and prior to AF-coating.

Tempering or strengthening of glass is also a known surface treatment. The principle in thermal as well as chemical hardening or chemical prestressing of glass is to create a compressive stress layer underneath the glass surface with a depth of approximately several 10 μm. This compressive stress layer results in that the tempered glass has greater strength. This is based in that surface defects are being compressed by the compressive stress forces. Otherwise, an expansion of these defects could cause a crack.

Chemical prestressing or tempering represents a long-known technology. Glass is dipped, for example, into a bath containing molten potassium nitrate at a temperature of around 400° C. This has the effect that the sodium ions in the glass surface are replaced by the potassium ions from the bath solution. The potassium ions are larger than the sodium ions, whereby the sodium ions migrate from the glass into the potassium melt and the potassium ions force themselves into the gaps that are left behind by the smaller sodium ions. This exchange of ions has the effect that the surface of the glass builds up a tension and the interior of the glass attempts to compensate the tension. The compressive surface tension of a chemically prestressed glass can reach more than 600 MPa.

Numerous documents from the state of the art describe chemical hardening or tempering:

U.S. Pat. No. 3,778,335 discloses glass compositions consisting of sodium aluminosilicate glass having a surface compressive stress layer that increases the strength in a glass article, as well as chemical prestressing of glass.

US 2013/0202715 A1 describes an aluminosilicate glass for a touch screen as well as chemical prestressing of the glass.

The state of the art has shown that there are many solution approaches for each characteristic such as antimicrobial, antireflective, anti-fingerprint characteristic, as well as for increased glass strength, in order to provide a glass surface with said characteristic. However, in some cases, a combination of several of these characteristics is desirable.

The cover glass of a touch screen, smart phone or tablet PCs is a typical example wherein many functions should be integrated. The devices are very thin and must have great mechanical strength, so that a tempered glass is necessary. At the same time, a surface that is provided with antireflective properties has the effect that energy can be saved, since the indicator module can work with lower brightness if the reflection at the glass-air interface is reduced. Moreover, a large volume of bacteria can be present on such screens, so that an antimicrobial surface could protect the health of the user. Ultimately, such screens are touched frequently every day, so that the anti-fingerprint property would also be very useful.

Showcase glass or glass for exhibits, for example picture glass in museums or glass used in shop windows, is another typical example. The high mechanical strength is a clear prerequisite for such glasses. The antireflective surface in these windows could result in the best effects. Conventional glass reflects approximately 8% of the incoming light. The antireflective coating reduces the reflection and thus permits a reliable view. These glass panes are also often touched by visitors, in particular children, if, for example, especially beautiful objects—for example in museums—are exhibited behind the glass. Therefore, an antimicrobial surface could also be advantageous regarding public health and provision of anti-fingerprint surfaces could reduce the frequency with which such glass panes must be cleaned.

Even though there is a high demand for such combinations of characteristics, no such technology or object exists currently that integrates all of these characteristics on the same glass surface. This is probably because it is relatively difficult to provide the desired properties in combination, since each of these properties and functions have several implementation routes and difficulties. Moreover, all functions imparted upon the glass surface must be preset permanently enough to meet the current industry quality standard, and the method should also be suitable for mass production.

Therefore, to effectively integrate all the properties of interest into the glass surface, there are only two possibilities: to develop a treatment process that provides many properties in one step; or to develop a treatment process that adds a function in each step, whereby the function obtained in a previous step is still present after the subsequent treatment. Neither of these two possibilities is feasible in a simple manner.

A few very limited function combinations have become known from the current state of the art:

WO 2012/163946 A1 describes a substrate element for coating with an easy-to-clean coating, comprising a carrier element and an antireflective coating applied onto the carrier element, wherein the uppermost layer of the antireflective layer represents an adhesion promoting layer that can interact with an easy-to-clean coating. In this document, it is also mentioned that the antireflective coated glass substrate can be thermally tempered without noticeably impairing the coating, so that an AR function and thermal tempering of glass can be combined.

DE 10 2007 009 785 B4 discloses a glass article that has been Sol-Gel coated, that is chemically tempered after coating, so that a combination of an AR coating and chemically prestressed glass is provided.

CN 102 923 966 A describes an antimicrobial and antireflective Sol-Gel coating. A metal compound with antimicrobial effect is doped to the coating, whereby the metal is selected from the group consisting of silver, copper, cadmium, zinc, iron, tin, cobalt, cerium, antimony, selenium, chromium, magnesium and nickel. It is also mentioned that the thermal treatment of the coating can be implemented together in one step with thermal tempering of the glass substrate, whereby the glass can be provided with antimicrobial and antireflective function and is hardened.

US 2012/0034435 A1 describes a chemically strengthened glass with antimicrobial properties, as well as a method to produce said glass. In particular, a chemically strengthened glass with antimicrobial properties is disclosed that has a coating with lower surface energy on the glass which does not impair the antimicrobial properties of the glass. Therefore, a combination of antimicrobial and anti-fingerprint function, as well as chemically strengthened glass is provided.

US 2014/0017462 describes a transparent cover glass for applications such as touch screen devices that has antimicrobial properties. The antimicrobial glasses contain nanoparticles of Cu or $Cu_2O$ on the glass surface. The antimicrobial glasses can also have a fluoro silane coating or another coating on the surface, so that an easy-to-clean surface is provided. This provides the glass antimicrobial and anti-fingerprint functions.

The known state of the art wherein multifunctional glass surfaces is described does not consider that the layers are to be arranged for chemical prestressing. Moreover, the antifingerprint (AF) coatings—if present—are not sufficiently resistant, so that the desired improvement in characteristics is perhaps temporarily available. Also, a film or a layer/layers that was/were applied onto the glass surface can block the ion exchange if the film or the layer were applied onto the glass surface before chemical prestressing. With chemically prestressed glasses, a relaxation of the built-up compressive stresses can occur during a subsequent heating of the glass, especially if the temperature is above 200° C. Many coating technologies require heating during layer production or after-treatment, due to which coating of the strengthened substrate is limited. Chemical prestressing in certain applications is, however, an important characteristic, since thin glass that is used in particular for cover glasses of touch screens in the entertainment and household electronics industry is the only possibility to increase the strength of the glass. This plays a role, for example, with mobile phones, smart phones, tablet-PCs, notebooks, TVs, ATMs, ticket machines or control displays in any devices or in a motor vehicle.

Thin glasses cannot be thermally strengthened due to their low thickness. Further, it has not been investigated to date which combinations are possible with anti-fingerprint (AF) coatings, and whether an AF coating with other functions, for example with an antimicrobial (AM) function, is even compatible and whether these do not influence each other negatively or even block each other. An additional important aspect is that the several functions provided to the glass surface should have sufficient resistance to be able to be utilized usefully in practice.

What is needed in the art is a glass or glass ceramic substrate that combines several of the described properties or functionalities, whereby the properties should be permanently present. It should also be possible to provide additional properties or functionalities. Furthermore, a method is needed that makes the production of such glass or glass ceramic substrate possible in a simple manner.

SUMMARY OF THE INVENTION

The present invention provides a coated glass or glass ceramic substrate with resistant multifunctional surface properties, including
  a combination of antimicrobial, antireflective and anti-fingerprint properties, or
  a combination of antimicrobial, antireflective and anti-fingerprint properties, whereby the substrate is chemically prestressed, or a combination of antimicrobial and antireflective properties, whereby the substrate is chemically prestressed.

The coated glass or glass ceramic substrates with resistant multifunctional surface properties according to the present invention can be used in multiple applications, for example as cover glasses for all types of touch screens, such as in entertainment and household electronics including mobile phones, smart phones, tablet-PCs, notebook-PCs, TVs, ATMs and similar devices. Additional fields of application are found in hospitals, museums, shops, in the building industry and in transportation, at ticket counters, control displays of devices or motor vehicles, advertising boards and everywhere where antimicrobial properties, low light reflection and possibly also easy cleanability and high mechanical strength are useful.

To date, there is no technology or coated glass or glass ceramic substrate that combines all of these properties or functions in one and the same glass surface. This is not easy to accomplish since each individual function is introduced into the glass surface in a completely different manner and each of these functions, and therefore also each of the used production methods, have completely individual prerequisites.

There are several possibilities as to how the various functions in or on a glass or glass ceramic surface can be realized. According to the invention, the antimicrobial function can be achieved through an ion exchange, whereby one or several antimicrobial metals ions are present in an antimicrobial effective volume, and can be selected from silver-, copper-, cadmium-, zinc-, iron-, tin-, cobalt-, cerium-, antimony-, selenium-, chromium-, magnesium- and nickel ions. No coating, for example in the form of a single layer consisting of antimicrobial effective metal salts, is applied onto the glass or glass ceramic surface or onto the antireflective coated glass or glass ceramic surface. The antireflective coating and the anti-fingerprint function can be through the provision of a coating consisting of one or more layers on the glass or glass ceramic substrate. The anti-fingerprint function or coating is generally the uppermost layer on the glass or glass ceramic substrate in order to fulfill their function. Chemical prestressing—if desired—can be implemented through ion exchange with the glass or glass ceramic substrate and the antireflective coating thereupon.

Surprisingly, it was determined that the property combinations according to the invention do not influence each other negatively. In particular, it is unexpected that the antimicrobial properties can be retained according to the invention without negatively influencing other functionalities of the coated glass or glass ceramic surface. The antimicrobial functionality is also not negatively influenced if an anti-fingerprint coating is applied onto the coated glass or glass ceramic surface. This is the case, in particular, if the AF coating—such as one based on a liquid phase coating—is applied.

The invention further relates to a method for the production of a coated glass or glass ceramic substrate with resistant multifunctional surface properties, comprising the following steps:
  Application of an antireflective coating onto a glass or glass ceramic substrate;
  Implementation of one of the 3 following ion exchange methods with the antireflective coated glass or glass ceramic substrate in a salt bath,
    1) whereby the salt bath contains one or several metal salts with antimicrobial effect, which can be selected from the group consisting of silver-, copper-, cadmium-, zinc-, iron-, tin-, cobalt-, cerium-, antimony-, selenium-, chromium-, magnesium- and nickel-salts in order to provide the glass or glass ceramic substrate with antimicrobial properties;

or 2) whereby the salt bath contains a mixture of potassium-, rubidium- and/or cesium salt with one or several metal salts with antimicrobial effect, which can be selected from the group consisting of silver-, copper-, cadmium-, zinc-, iron-, tin-, cobalt-, cerium-, antimony-, selenium-, chromium-, magnesium- and nickel-salts in order to provide the glass or glass ceramic substrate with antimicrobial properties and to chemically prestress it at the same time;

or 3) whereby in a first step the first salt bath contains potassium-, rubidium- and/or cesium salt, and in a second step the second salt bath contains a mixture of potassium-, rubidium- and/or cesium salt with one or several metal salts with antimicrobial effect, which can be selected from the group consisting of silver-, copper-, cadmium-, zinc-, iron-, tin-, cobalt-, cerium-, antimony-, selenium-, chromium-, magnesium- and nickel-salts in order to provide the glass or glass ceramic substrate with antimicrobial properties and to chemically prestress it; and optional application of an anti-fingerprint coating onto the obtained antireflective coated glass or glass ceramic surface.

In the current description, the term "antireflective" is also referred to as "AR", the term "antimicrobial" as "AM" and the term "anti-fingerprint" as "AF".

According to the invention an antireflective (AR) coating is provided that can be based on the Sol-Gel technology and that is suitable for an ion exchange and thereby also for chemical prestressing of the glass or glass ceramic surface.

The top layer of the AR coating, which can be Sol-Gel coating, can be an adhesion promoting layer in order to be able to apply a permanent AF coating. According to a method of the present invention, the glass or glass ceramic surface with the AR coating can then be provided through an appropriate metal melt with antimicrobial ions, for example silver ions (ion exchange process (1) or it can—in the same step—be furnished with antimicrobial properties and chemically prestressed (ion exchange process). Or, chemical prestressing and provision of antimicrobial properties can occur in two subsequent steps (ion exchange process (3).

Subsequently, an anti-fingerprint coating can be applied, if necessary, the glass or glass ceramic surface then has antimicrobial (AM), antireflective (AR) and anti-fingerprint (AF) properties and can at the same time be chemically prestressed.

In applications where a greater strength is of lesser importance, for example for picture frames, display windows or thicker window glasses, the ion exchange process is only used to provide the glass with antimicrobial functionality. Increasing the strength through doping with larger alkali ions, such as potassium ions, is not necessary in this case. The anti-fingerprint coating is then only applied if it is expedient for the respective purpose, for example for touch screen applications.

According to the invention, glass or glass ceramic substrates are thus provided with durable multifunctional surface and various characteristics combinations.

The individual characteristics or functions with which the glass or glass ceramic substrate is provided, is explained further herein.

Antireflective (AR) Coating

The AR-coated substrate that is produced in one step of the method comprises a glass or glass ceramic carrier material and an antireflective coating.

According to one embodiment, the antireflective coating consists of one or at least two layers. The one layer, or the uppermost layer of the at least two layers can be an adhesion promoting layer that can interact with an anti-fingerprint or easy-to-clean layer that is to be applied thereupon, thereby resulting in long-term stability of the anti-fingerprint coating. The adhesion promoting layer is a layer that causes improved adhesion between the layer below and above it. It interacts with an applied anti-fingerprint coating in such a way that due to a chemical, such as covalent, bonding between the adhesion promoting layer of the substrate and an anti-fingerprint layer that is applied thereupon, the long-term stability of the anti-fingerprint coating is increased.

Surprisingly, the function of the antireflective layer(s) is not negatively influenced by the ion exchange that is implemented to obtain the antimicrobial characteristics (for example ion exchange of sodium ions with silver ions), or by the ion exchange implemented for chemical prestressing (for example ion exchange of sodium ions with potassium ions). Conversely it was also noted that the ion exchange for chemical prestressing as well as for on the function of a possibly present adhesion promoting layer.

The adhesion promoting layer that can be the top layer of the antireflective coating can also have a low refractive index.

If the antireflective coating represents an individual layer that is in the embodiment of an adhesion promoting layer, the refractive index can be in the range of 1.22 to 1.44, such as in the range of 1.28 to 1.44. In the case of an AR-coating that consists of several layers and wherein the top layer is an adhesion promoting layer, the refractive index of the top layer can be in the range of 1.22 to 1.70, such as in the range of 1.28 to 1.60 or in the range of 1.28 to 1.56.

The antireflective coating can be composed such that it represents an incomplete antireflective coating and that only after application of an AF-coating is an optically complete antireflective coating obtained. The optical contribution of the AF-coating is, however, generally small, because it is very thin. In some cases, the AF-coating can therefore also be optically inactive.

The antireflective coating can also be composed such that it is an incomplete antireflective coating and is a complete antireflective coating only after provision of an adhesion promoting layer and, if required, an AF-coating.

According to an additional embodiment, the antireflective coating consists of three or more layers with alternating medium, high and low refractive indexes. Also in this case, the top layer can be an adhesion promoting layer and can have a low refractive index.

At least one layer of the antireflective coating, such as the top or adhesion promoting layer, can be divided into sublayers, whereby one or several intermediate layers may be present.

The one or several intermediate layers then have practically the same refractive index as the lower layers.

In such a case, an adhesion promoting layer is useful and develops its function especially if it represents a mixed oxide. According to one embodiment of the invention, the adhesion promoting layer is therefore a mixed oxide layer, such as a silicon mixed oxide layer, for example a silicon oxide layer mixed with an oxide of at least one of the following elements: aluminum, tin, magnesium, phosphorus, cerium, zircon, titanium, barium, strontium, niobium, zinc, boron, hafnium and/or magnesium fluoride, such as at least one oxide of the aluminum element.

In the context of the present invention, "silicon oxide" is understood to be any silicon oxide between silicon mono- and silicon dioxide. In the context of the present invention, silicon is understood to be a metal and a metalloid. Silicon mixed oxide is a mixture of silicon oxide and an oxide of at least one of the other elements that can be homogeneous or non-homogeneous, stoichiometric or non-stoichiometric.

The adhesion promoting layer can have a thickness which is greater than 1 nm, such as greater than 10 nm or greater than 20 nm.

In principle, each coating can be used as antireflective coating and include an adhesion promoting layer. An anti-reflective coating can be applied by printing technology, spray technology and vapor deposit technology. A liquid phase coating or a Sol-Gel coating can be used. The anti-reflective coating can comprise or consist of the adhesion promoting layer and can be applied by CVD-technology, for example by PECVD, PICVD, low pressure CVD- or vapor deposition at atmospheric pressure (AVD, atomic vapor deposition; ALD atomic layer deposition). The anti-reflec-tive coating can also be applied by PVD-technology, for example through sputtering, thermal evaporation, laser beam-, electron beam- or arc-evaporation. The adhesion promoting layer can alternatively be deposited through flame pyrolysis technology.

The adhesion promoting layer and the other layers of the antireflective coating can alternatively be produced through combinations of various methods.

An exemplary Sol-Gel coating process and a process to produce an antireflective coating is described below:

The surface to be coated is cleaned. Cleaning of glass or glass ceramic substrates with fluids is a wide spread process. A multitude of cleaning fluids can be used, such as demin-eralized water or aqueous systems such as diluted alkaline solutions (pH>9) and acids, detergent solutions or non-aqueous solvents, for example alcohols or ketones.

The glass or glass ceramic substrate can be activated prior to coating. Activation processes comprise, for example, oxidation, Corona discharge, flame treatment, UV treatment, plasma activation and/or mechanical processes such as roughening, sand blasting and also plasma treatments or other treatments of the substrate surface for activation with an acid and/or alkaline solution.

One exemplary Sol-Gel method uses implementation of organometallic starting material in a dissolved state to form the layers. As a consequence of a controlled hydrolysis and condensation reaction of the organometallic starting mate-rials, a metal oxide network structure is created, that is a structure in which metal atoms relate to one another through oxygen atoms, simultaneously with elimination of the reac-tive products such as alcohol and water. The hydrolysis can be accelerated through the addition of catalysts.

The inorganic Sol-Gel material from which the Sol-Gel layers are produced can be a condensate, including one or several hydrolysable or condensable silane and/or metal oxides of Si, Ti, Zr, Al, Nb, Hf, Ge, B, Sn and/or Zn. In the Sol-Gel method, the groups that are cross-linked through inorganic hydrolysis and/or condensation can be the follow-ing functional groups: $TiR_4$, $ZrR_4$, $SiR_4$, $AlR_3$, $TiR_3(OR)$, $TiR_2(OR)_2$, $ZrR_2(OR)_2$, $ZrR_3(OR)$, $SiR_3(OR)$, $SiR_2(OR)_2$, $TiR(OR)_3$, $ZrR(OR)_3$, $AlR_2(OR)$, $AlR(OR)_2$, $Ti(OR)_4$, $Zr(OR)_4$, $Al(OR)_3$, $Si(OR)_4$, $SiR(OR)_3$ and/or $Si_2(OR)_6$. The group OR can, for example, be: alkoxyl, such as methoxy, ethoxy, n-propoxy, isopropoxy, butoxy, isopropoxyethoxy, methoxypropoxy, phenoxy, acetoxy, propionyloxy, ethanolamine, diethanolamine, triethanolamine, methacryloxy-propyl, acrylate, methylacrylate, acetylacetone, ethylac-etoacetate, ethoxy acetate, methoxy acetate, methoxy ethoxy acetate and/or methoxyethoxyethoxyacetate. The remainder R can for example be: Cl, Br, F, methyl, ethyl, phenyl, n-propyl, butyl, allyl, vinyl, glycidylpropyl, methacryloy-loxypropyl, aminopropyl and/or fluoroctyl.

A common characteristic of all Sol-Gel reactions is that the molecular dispersed precursors are subject to a hydro-lysis condensation and polymerization reactions to create particular dispersed or colloidal systems. Depending on the selected conditions, the "primary particles" that are initially formed can grow further and combine in order to form clusters, or, rather, can form a linear chain. The resulting units lead to micro-structures that are formed due to the removal of the solvent. In an ideal situation, the material can be thermally completely compressed. In reality however, a degree of porosity often remains—in some cases even a substantial residual porosity. The chemical conditions dur-ing the Sol production have a critical influence upon the properties of the Sol-Gel coating, as described in P. Lob-mann, "Sol-Gel Coatings", Advanced Training Course 2003, Surface Processing of Glass"—Hüttentechnische Vereini-gung der deutschen Glasindustrie (Research Association of the German Glass Industry).

The Si starting materials have been closely examined to date. In this regard, reference is made to C. Brinker, G. Scherer, "Sol-Gel-Science—The Physics and Chemistry of Sol-Gel Processing" (Academic Press, Boston 1990), R. Iller, The Chemistry of Silica (Wiley, New York, 1979). The Si starting materials that are used most often are silicon alkoxides of the formula $Si(OR)_4$ that hydrolyze when water is added. Under acidic conditions, linear aggregates can be formed. Under alkaline conditions, the silicon alkoxides react to form more highly cross-linked "globular" particles. The Sol-Gel coatings contain pre-condensed particles and clusters.

To produce a silicon oxide dipping solution for the glass or glass ceramic substrate according to the present inven-tion, the dipping solution can be produced as follows:

The silicon starting compound(s) is (are) dissolved in an organic solvent. Solvents finding use herein, can be any organic solvent that dissolve the silicon starting compound(s) and that are capable of dissolving a sufficient volume of water that is necessary for the hydrolysis of the silicon starting compounds. Suitable solvents are, for example, toluene, cyclohexane acetone, or $C_{1-6}$ alcohols. Examples of such alcohols are methanol, propanol, butanol, pentanol, hexanol or isomers thereof. It is useful to use lower alcohols, in particular methanol and ethanol, since these are easy to handle and have a relatively low vapor pressure.

The utilized silicon starting compound can be a $C_{1-4}$ alkyl ester of a silicic acid; that is, a silicic acid methyl ester, -ethyl ester, -propyl ester or -butyl ester.

The concentration of the silicon starting compound in the organic solvent is normally around 0.05 to 1 mol/liter. For the hydrolysis of the silicon starting compound, this solution is mixed in the described example with 0.05 to 12 weight-% water, such as distilled water, and with 0.01 to 7 weight-% of an acid catalyst. Hereto organic acids, such as acetic acid, methoxy-acetic acid, polyether carbon acids (for example ethoxy-ethoxy acetic acid), citric acid, para-toluene sulfonic acid, lactic acid, methacrylic acid or acrylic acid or mineral acids such as $HNO_3$, $HCl$ or $H_2SO_4$ can be added.

The pH value of the solution can be approximately 0.5 and <3. If the solution is not sufficiently acidic (pH≤>3), there is a danger that the poly-condensate/clusters become too large.

In an additional embodiment, the solution can be produced in two steps. One of the steps occurs as described above. This solution is then left to mature. The maturing time is achieved in that the matured solution is diluted with additional solvents and/or maturing is interrupted by moving the pH-value of the solution into the strongly acid range. Moving into a pH-range of 1.5 to 2.5 can be done. Moving the pH-value into the strongly acid range can be done through addition of an inorganic acid, such as through addition of hydrochloric acid, nitric acid, sulfuric acid or phosphoric acid or any organic acid such as oxalic acid or the like. The strong acid can be in the solvent in which the silicon starting compound is already in a dissolved state. It is herein also possible to add the acid in a sufficient volume together with the solvent, such as in an alcoholic solution so that the dilution of the starting solution and the interruption of the maturing process occur in one step.

The Sol-Gel coatings comprise pre-condensed particles and clusters that can have different structures. These structures can be determined through implementation of scattered light experiments. By control of the process parameters such as temperature, rate of addition, stirring speed, and the pH-value, it is possible that these structures are produced in the solution. It has been shown that the use of smaller silicon oxide-poly-condensates/clusters with a diameter of ≤20 nm, such as ≤4 nm or in the range of 1 to 2 nm, facilitates the production of immersion-layers that are packed more densely than conventional silicon oxide layers. This leads, for example, to an improvement of the chemical resistance of the layer.

An additional improvement of the chemical resistance and the function as an adhesion promoting layer is achieved in that small amounts of an additive or several additives are added to the solution that are present homogenously in the solution and later also distributed in the layer, forming a mixed oxide. Suitable additives are hydrolysable or dissociating inorganic salts, possibly containing crystallization water, selected from the salts of tin, aluminum, phosphorus, boron, cerium, zircon, titanium, cesium, barium, strontium, niobium and/or magnesium. Examples are $SnCl_4$, $SnCl_2$, $AlCl_3$, $Al(NO_3)_3$, $Mg(NO_3)_2$, $MgCl_2$, $MgSO_4$, $TiCl_4$, $ZrCl_4$, $CeCl_3$, $Ce(NO_3)_3$ and the like. These inorganic salts can be used in aqueous form or also with crystallization water.

According to an additional embodiment of the present invention, the additive or additives can be selected from one or several metal oxides of tin, aluminum, phosphorus, boron, cerium, zircon, titanium, cesium, barium, strontium, niobium and/or magnesium. Also suitable are phosphoric acid ester, such as phosphoric acid methyl ester or -ethyl ester, phosphoric halides such as chlorides and bromide, boric acid ester such as ethyl-, methyl-, butyl or propyl ester, boric acid anhydride, $BBr_3$, $BCI_3$, magnesium methylate or -ethylate and the like.

According to an additional embodiment of the present invention, the additives can also be selected as inorganic fluorides, for example $MfG_2$, $CaF_2$, etc., that are present in the form of nanoparticles <200 nm.

The one or more additive(s) are added, for example, in a concentration of approximately 0.5 to 20 weight-%, calculated as oxide (or fluoride), based on the silicon content in the solution, calculated as $SiO_2$. The additive or additives can also be used in combination.

If the dipping solution is to be stored or used otherwise over a longer period, it can be useful for this solution to be stabilized through the addition of one or more complexing agents. These complexing agents should be solvable in the dipping solution and can be consistent with the solvent of the dipping solution.

Complexing agents that can be used include, for example, ethyl acetoacetate, 2,3-pentanedion (acetyl acetone), 3,5-heptandion, 4,6-nonandion, 3-metyhl-2,4-pentanedion, 2-acetylacetone, triethanolamine, diethynolamine, ethanolamine, 1,3-propandiol, 1,5-pentanediol, carbonic acids, such as acetic acid, propionic acid, ethoxy acetic acid, methoxy acetic acid, polyether-carbonic acids (i.e. ethoxy-ethoxy acetic acid), citric acid, lactic acid, methyl-acrylic acid and acrylic acid and the like.

The molar ratio of complexing agents to metalloid oxide precursors and/or metal oxide precursors can be in the range of 0.1 to 5.

In one exemplary embodiment, the glass or glass ceramic material is pulled from the solution during Sol-Gel coating at a target speed of approximately 50-1500 mm/min., such as 200-1000 mm/min., whereby the moisture content of the ambient air is between 4 $g/m^3$ and approximately 12 $g/m^3$, such as around approximately 8 $g/m^3$.

The dip-coated layer can be dried after application to achieve higher mechanical strength. Drying can, for example, be implemented in a high temperature furnace at a broad temperature range. The drying times are typically a few minutes at temperatures in the range of 100-200° C.

The formation of the applied layer occurs in a high temperature step in the progression of which the organic components of the gel can be burned off. In order to finally form the mixed oxide layer, a silicon mixed oxide layer that can act, for example, as an adhesion promoting layer is heated below the softening temperature of the glass or glass ceramic material, for example at temperatures of less than 550° C., such as between 35° and 500° C., or between 40° and 500° C. It is also possible to utilize temperatures higher than 550° C., but the selected duration should then also be short so that the glass substrate (depending on the thickness of the glass substrate) does not distort. Such temperatures generally do not result in an additional improvement of the adhesion strength of the layer.

Antimicrobial (AM) Property and Chemical Prestressing Through Ion Exchange

The coated glass or glass ceramic surface is provided with antimicrobial properties by an ion exchange process. One or several salts, such as one or several metal salts that provide an antimicrobial effect, are introduced into the substrate and probably also into the layer(s) deposited thereupon in an antimicrobially effective volume, wherein the metal can be selected from the group consisting of silver, copper, cadmium, zinc, iron, tin, cobalt, cerium, antimony, selenium, chromium, magnesium and nickel. The metal can be, for example, silver salts such as silver nickel, silver chloride, silver fluoride, silver bromide, silver oxide, silver sulfate, silver carbonate, silver cyanide, silver tetrafluorborate, silver sulfide, silver acetate, silver lactate, silver benzoate, silver cyclohexanebutyrate, silver diethyldithiocarbamate, silver trifluormethansulfonate and mixtures thereof. The metal can be $AgCl$-/$AgNO_3$ and/or $ZnCl$ and/or $ZnNO_3$-containing mixtures. The provision of the antimicrobial properties occurs according to the invention through an ion exchange in a salt or molten bath, whereby the ion exchange occurs with the glass or glass ceramic and the antireflective coating deposited thereupon. The ion exchange for equipping the glass or glass ceramic substrate with antimicrobial properties can be implemented the same as the ion exchange for chemical prestressing.

The glass or glass ceramic substrate of the present invention can—depending upon the desired characteristics profile—also be chemically prestressed to thereby gain higher mechanical strength and scratch resistance as would be the case without chemical prestressing. Within the scope of the present invention, chemical prestressing can also be implemented through ion exchange as known from the current state of the art, whereby however according to the invention the ion exchange is performed through the antireflective coating that is deposited on the glass or glass ceramic. The ion exchange of smaller alkaline metal ions, i.e. sodium and/or lithium ions from the glass through larger alkaline metal ions, for example, potassium, rubidium and/or cesium ions, results in a compressive stress layer that prevents mechanical damage such as scratching or abrasion, thus making the glass or the glass ceramic more resistant against damage. Within the scope of the present invention, chemical prestressing may be implemented or foregone, depending upon the desired application field and the required property combinations.

Chemical prestressing can be performed, for example, through immersion into a potassium-based solution, such as a potassium nitrate-based salt melt. The possibility also exists to utilize an aqueous potassium nitrate solution, -paste or -dispersion, as is described in detail, for example, in WO 2011/120656. Chemical prestressing can be characterized by the depth of ion exchange layer (DOL) and the compression strength (CS).

If the glass or glass ceramic surface is to possess antimicrobial properties and at the same time is to be chemically prestressed, the glass or glass ceramic substrate can be, for example, treated in two subsequent steps, that is, the glass or the glass ceramic can be chemically prestressed in one step and can be provided with antimicrobial properties in another step.

It has been found that when both treatments are performed together in one step (method 2) or when two steps are performed whereby in the first step chemical prestressing occurs and whereby in the second step a mixture of compound(s) with antimicrobial properties and alkali salt(s) suitable for chemical prestressing are used in a salt bath (method 2), the ion exchange in the first step occurs, for example, in a potassium nitrate salt bath and the second step occurs, for example, in a mixture of potassium salt(s) and silver salt(s), i.e. a mixture of $KNO_3$ and $AgNO_3$.

If only one step is performed or if the first ion exchange step for chemical prestressing is performed, then the ion exchange process can be performed in a salt bath at a temperature between 35° and 500° C. for a duration of 0.5 to 48 hours. If aluminum silicate and boroalumino silicate glasses or glass-ceramics based thereupon are used, the temperature can be between 400 to 450° C. and the duration between 1 and 8 hours. If soda-lime glass or a glass-ceramic based thereupon is used, the temperatures can be between 39° and 480° C. for a duration of between 2 and 24 hours. Borosilicate glasses or glass-ceramics based thereupon are treated, for example, at temperatures between 44° and 500° C. for a duration between 4 and 48 hours.

If chemical prestressing and the provision of antimicrobial properties are performed in one single ion exchange step (variation 2), the concentration of the antimicrobial effect providing metal salts in the salt bath, for example in the form of one or several silver salts, can be 0.01 to 2 weight-%, such as 0.01 to 0.5 weight-%. If the ion exchange step for the provision of antimicrobial properties is the second step (variation 3) that is performed after chemical prestressing, then the ion exchange process is performed at a temperature between 40° and 500° C. for duration between 0.25 and 2 hours. The concentration of the one or several antimicrobial effect-providing metal salts can be 0.01 to 2 weight-%, such as 0.01 to 0.5 weight-%.

It was surprisingly found that after performing the ion exchange process—regardless whether in one or two steps—the desired antimicrobial properties and at the same time corresponding properties of a chemically prestressed glass are obtained. For aluminosilicate and boroalumino silicate glasses and the glass-ceramics based thereupon, it was found, for example, that the compressive stress (CS) of the surface is ≥600 MPa and the depth of the compressive stress layer DoL (depth of ion exchanged layer) is ≥20 μm. For soda-lime glasses and the glass-ceramics based thereupon, it was noted that the compressive stress CS of the surface is ≥100 MPa, such as ≥200 MPa or ≥300 MPa, and the depth of the surface compressive stress DOL is ≥5 μm. These values are in the same range as for glasses or glass ceramics that were only chemically prestressed through ion exchange, without providing them simultaneously with antimicrobial properties.

Moreover, it was found that the glass or glass ceramic substrates produced according to the present invention, can have antimicrobial effectiveness of >90% against E. coli and S. aureus, such as greater than 99% or even >99.9%, such as >99.99%. The method for measuring the antimicrobial effectiveness occurs according to standard JIS Z 2801 or ISO 22196. The values for the antimicrobial effectiveness are in the same range as for glasses or glass ceramics that are only provided with antimicrobial properties.

The glass and/or glass ceramic substrates formed according to the present invention also have an antimicrobial effect against other bacteria, such as pneumonias and p. aeruginosa. It is known that, for example, silver ions have an antimicrobial effect against approximately 650 types of bacteria and other micro-organisms, including viruses, bacteria, fungi, algae and the like, so that the present antimicrobial substrates can fully and entirely possess this characteristics spectrum.

Anti-Fingerprint (AF) Coating

According to one embodiment of the present invention, the ion-exchanged, antireflective coated glass and/or glass ceramic substrate can be provided with an AF coating that is also known as an easy-to-clean coating or amphiphobic coating.

An AF-coating has hydrophobic and oleophobic (amphiphobic) properties, such that wetting of the surface through water and oils is reduced to a minimum. The wetting property of a surface having an AF-coating must therefore be such that the surface is hydrophobic—in other words that the angle of contact between surface and water is greater than 90°—as well as oleophobic—in other words that the contact angle between surface and oil is greater than 50°.

The AF-coating can be a surface layer including silane that contains the alkyl and/or fluoroalkyl groups, for example, 3,3,3-trifluoropropyltrimethoxysilane or pentyltriethoxysilane.

The AF-coating can also be a surface layer on a fluorine base that is based on compounds with hydrocarbon groups, whereby the C—H compound is partially, or essentially completely, replaced by C—F compounds. Such compounds can be perfluorohydrocarbons with the formula, for example, of $(R_F)_nSiX_{4-n}$, whereby $R_F$ represents a $C_1$- to $C_{22}$-alkylperfluorohydrocarbon or—alkylperfluoropolyether, such as $C_1$- to $C_{10}$-alkylperfluorohydrocarbon or—alkylperfluoropolyether, n is an integer from 1 to 3, X is a hydrolysable group such as halogen or an alkoxy group or, wherein R, for example, represents a linear or a branched hydrocarbon with 1 to 6 hydrocarbon atoms. In this case, the hydrolysable group X can, for example, react with a terminal OH-group of the coating of the glass substrate, thus binding to same by creating a covalent bond. Perfluorohydrocarbons can be used to reduce the surface energy because of the low polarity of the terminal fluoric surface conditions.

The AF coating can, for example, also be derived from a mono-layer of a molecular chain with fluorine end groups, a fluoropolymer coating or from silicon oxide soot particles that were previously provided with fluorine end groups or were treated with same.

AF coatings are described, for example, in DE 19848591, EP 0 844 265, US 210/0279068, US 2010/0285272, US 2009/0197048 and WO 2012/163947, the disclosures of which are hereby incorporated by reference. Known AF-coatings are, for example, products based on perfluoropolyether and the designation "Fluorolink®PFPE", such as "Fluorolink® S10" by the Solvay Solexis company, or also "Optool™ DSX" or Optool™AES4-E" by Daikin Industries LTD, "Hymocer® EKG 6000N" by ETC Products GmbH of fluorosilanes under the designation "FSD" such as "FSD 2500" or FSD 4500" by Cytonix LLC or easy-clean coating "ECC" products such as "ECC 3000" or "ECC 4000" by 3M Germany GmbH. These are layers that are applied in liquid form. AF-coatings, for example nanolayer systems that are applied by physical vapor deposition, are offered, for example, by Cotec GmbH under the designation "DUR-ALON Ultra Tec".

The coating may be applied to the surface by immersion, vapor coating, spraying or application with a roll or cylinder or a doctor blade, through thermal vacuum deposition or sputtering, through liquid phase methods such as spraying, immersion coating, printing, roll-on, spin-coating, or other suitable methods. After the coating has been applied it is hardened at a suitable temperature for a suitable period of time.

The water contact angle of the AF-coating can be >90°, such as >100° or >110°.

It was noted that the applied coating on the glass or glass ceramic substrate in the form of the AF-coating had no negative influence over the release of the antimicrobially effective ions from the glass or glass ceramic surface and thus also had no negative effect upon the microbial effectiveness of the obtained antimicrobial glass and/or glass ceramic surface.

It was also discovered that application of an AF layer onto an AR coating regularly resulted in an improvement of the abrasion resistance of the entire coating system.

Antiglare Property

In addition, or alternatively, to one of the described properties, a glass or glass ceramic substrate formed according to the present invention can also possess antiglare properties.

An antiglare surface describes a surface that can convert the physical light radiation into a diffused reflection instead of a mirroring reflection. An antiglare surface is useful in situations where high transmission through a surface is not as important, but where instead a low reflectivity is necessary. Within the scope of the present invention, the antiglare function can be present in a glass or glass ceramic surface, for example combined with the AM, AR, AF properties as well as possibly with chemical prestressing.

There are several possibilities to make a glass surface matted, e.g., embossing of structures during a hot forming process or etching of the glass surface with acid. The surface can subsequently be coated with one or several AR layers. Small particles can also be integrated into an AR coating, except for the top layer of the AR coating; or a texture or pattern can be integrated into or applied onto the surface to enhance the surface light diffusion. The described properties can moreover also be combined with an antiglare glass substrate, for example Xensation Cover AG as sold by Schott AG, having multi-functionalities such as AM, AT, optionally AF and, if required, chemical prestressing.

An antiglare coating can therefore be produced for example by embossing a Sol-Gel layer or by addition of nanoparticles into the Sol-Gel solution, so that the roughness is increased and can be in the range of 5 nm to 5 μm.

An antiglare surface that is obtained, for example, in the form of a matted and/or etched and/or textured surface, the mirrored reflection is transformed into a dull reflection. This so-called scattering of the reflected light renders reflected images blurred, so that various shapes and reflected light sources do not distract from the object portrayed behind the glass or the glass ceramic. Scattering of the light does not reduce the overall reflection or the absorption of the radiated light on the glass or glass ceramic surface or in the glass or glass ceramic substrate. The light is not only directed, but is scattered in all directions in space. The total amount of light remains the same.

Etched surfaces offer the following properties: the diffused scattering of bright reflected light permits better recognition of transmitted images and texts. Textured surfaces are sometimes also used as alternative to antireflection coatings. The brilliance of directly reflected light sources is hereby reduced. Due to its structure, the surface displays reduced static friction coefficients in contact with a plurality of materials and surfaces. The herewith associated improved feel makes said surface especially attractive for use in touch-display applications. The reduced effective contact surface between such a textured surface and other touching surfaces leads to a purely mechanically induced "antifingerprint" functionality. Many times, this also motivates the use in touch-display applications. Contaminations however, that have found their way into the structures of the surface are more difficult to remove than from a smooth surface.

In one embodiment formed according to the present invention, the antireflective layer can be used, for example, in combination with an antiglare layer. The antireflective layer, as well as an AF layer that is applied thereupon, assume the roughness of the antiglare layer, while at the same time the AF- and antireflective properties are maintained.

The Glass or Glass Substrate

Each glass or glass ceramic composition in which the desired ion exchange can be performed, e.g., sodium ions for potassium ions for chemical prestressing and/or sodium ions for silver ions for provision of antimicrobial properties in the glass or glass ceramic, is acceptable for use according to the present invention. The glass or glass ceramic material that is provided with the AR coating can be any ion-exchangeable glass selected from: silicate glass, phosphate glass, borosilicate glass, aluminosilicate glass, boroalumino silicate glass, tin-phosphate glass, borophosphate glass, titanium glass, barium glass, such as alkali metal-containing silicate glass or sodium-containing silicate glass.

The glass is, for example, an alkali-aluminosilicate glass with the following composition:

| Composition | Weight-% |
|---|---|
| $SiO_2$ | 40-75 |
| $Al_2O_3$ | 10-30 |
| $B_2O_3$ | 0-20 |
| Sum of $Li_2O + Na_2O + K_2O$ | 4-30 |
| Sum of $MgO + CaO + SrO + BaO + ZnO$ | 0-15 |
| Sum of $TiO_2 + ZrO_2$ | 0-15 |
| $P_2O_5$ | 0-10 |

The glass material can be, for example, a borosilicate glass with the following composition:

| Composition | Weight-% |
|---|---|
| $SiO_2$ | 60-85 |
| $Al_2O_3$ | 1-10 |
| $B_2O_3$ | 5-20 |
| Sum of $Li_2O + Na_2O + K_2O$ | 2-16 |
| Sum of $MgO + CaO + SrO + BaO + ZnO$ | 0-15 |
| Sum of $TiO_2 + ZrO_2$ | 0-5 |
| $P_2O_5$ | 0-2 |

The glass material can be, for example, a soda-lime glass with the following composition:

| Composition | Weight-% |
|---|---|
| $SiO_2$ | 40-80 |
| $Al_2O_3$ | 0-6 |
| $B_2O_3$ | 0-5 |
| Sum of $Li_2O + Na_2O + K_2O$ | 5-30 |
| Sum of $MgO + CaO + SrO + BaO + ZnO$ | 5-30 |
| Sum of $TiO_2 + ZrO_2$ | 0-7 |
| $P_2O_5$ | 0-2 |

The glass material can be, for example, an aluminosilicate glass with low alkali content with the following composition:

| Composition | Weight-% |
|---|---|
| $SiO_2$ | 50-75 |
| $Al_2O_3$ | 7-25 |
| $B_2O_3$ | 0-20 |
| Sum of $Li_2O + Na_2O + K_2O$ | 1-4 |
| Sum of $MgO + CaO + SrO + BaO + ZnO$ | 5-25 |
| Sum of $TiO_2 + ZrO_2$ | 0-10 |
| $P_2O_5$ | 0-5 |

The glass material can be a lead glass with the following composition:

| Composition | Weight-% |
|---|---|
| $PbO$ | 20-80 |
| $SiO_2$ | 20-60 |
| $K_2O$ | 0-10 |
| $Na_2O$ | 1-10 |
| $BaO$ | 0-20 |
| $SrO$ | 0-20 |
| $Al_2O_3$ | 0-10 |
| $CaO$ | 0-10 |
| $F_2O_3$ | 0-1 |
| $Sb_2O_3$ | 0-1 |
| $ZnO$ | 0-20 |

-continued

| Composition | Weight-% |
|---|---|
| $B_2O_3$ | 0-20 |
| $ZrO_2$ | 0-10 |

The glass material can be a glass with the following composition:

| Composition | Weight-% |
|---|---|
| $SiO_2$ | 10-90 |
| $Al_2O_3$ | 0-40 |
| $B_2O_3$ | 0-80 |
| $Na_2O$ | 1-30 |
| $K_2O$ | 0-30 |
| $CoO$ | 0-20 |
| $NiO$ | 0-20 |
| $Ni_2O_3$ | 0-20 |
| $MnO$ | 0-20 |
| $CaO$ | 0-40 |
| $BaO$ | 0-60 |
| $ZnO$ | 0-40 |
| $ZrO_2$ | 0-10 |
| $MnO_2$ | 0-10 |
| $CeO$ | 0-3 |
| $SnO_2$ | 0-2 |
| $Sb_2O_3$ | 0-2 |
| $TiO_2$ | 0-40 |
| $P_2O_5$ | 0-70 |
| $MgO$ | 0-40 |
| $SrO$ | 0-60 |
| $Li_2O$ | 0-30 |
| $Li_2O + Na_2O + K_2O$ | 1-30 |
| $SiO_2 + B_2O_3 + P_2O_5$ | 10-90 |
| $Nd_2O_5$ | 0-20 |
| $V_2O_5$ | 0-50 |
| $Bi_2O_3$ | 0-50 |
| $SO_3$ | 0-50 |
| $SnO$ | 0-70 | whereby the content of $SiO_2+P_2O_5+B_2O_3$ is 10-90 weight-%.

The glass material can be a lithium-aluminum-silicate glass with the following composition:

| Composition | Weight-% |
|---|---|
| $SiO_2$ | 55-69 |
| $Al_2O_3$ | 19-25 |
| $Li_2O$ | 3-5 |
| Sum of $Na_2O + K_2O$ | 0.5-15 |
| Sum of $MgO + CaO + SrO + BaO$ | 0-5 |
| $ZnO$ | 0-4 |
| $TiO_2$ | 0-5 |
| $ZrO_2$ | 0-3 |
| Sum of $TiO_2 + ZrO_2 + SnO_2$ | 2-6 |
| $P_2O_5$ | 0-8 |
| $F$ | 0-1 |
| $B_2O_3$ | 0-2 |

The above glass compositions can possibly contain additions of coloring oxides, for example $Nd_2O_3$, $Fe_2O_3$, $CoO$, $NiO$, $V_2O_5$, $MnO_2$, $TiO_2$, $CuO$, $CeO_2$, $Cr_2O_3$, rare earth oxides in amounts of 0-5 weight-% or, for "black glass", 0-15 weight-%, as well as refining agents such as $As_2O_3$, $Sb_2O_3$, $SnO_2$, $SO_3$, Cl, F, $CeO_2$, in amounts of 0-2 weight-%.

The components of the glass compositions always amount to 100 weight-%.

The glasses can be produced, for example, by a draw method such as the up-draw or down-draw method, overflow fusion, float technology or from a cast or rolled glass.

In particular, with a cast or rolled glass method or with a floated glass the necessary optical quality of the surface that is required, for example, for a display cover screen may be obtained through a polishing technology.

In an additional embodiment of the present invention, the substrate may also represent a glass ceramic that is obtained through conversion of the glass by utilizing a thermal treatment.

Glass ceramic is a type of crystallized glass. The glass can be completely or partially crystallized; for example, only the upper part of the surface and/or a lower part of the surface may be crystallized. The glass ceramic material has different properties than glass and different properties than ceramic. Glass ceramic has an amorphous phase and one or several crystalline phases that are produced through "crystallization control" in contrast to spontaneous crystallization that is not desirable in a glass product. Glass ceramic has generally 30-90 vol.-% of crystalline phase and can thus be used to produce a series of materials having interesting mechanical characteristics.

The utilized glass ceramic can, for example, be produced according to the following method: During the glass production process, the raw materials are initially melted at temperatures higher than 1000° C., 1200° C., 1300° C., 1400° C., 1500° C., 1550° C., 1600° C. or 1650° C. in order to create glass, whereby the glass melt is set up after homogenization; and then at a predetermined temperature after cooling, a nucleation and crystallization is performed in order to produce a glass ceramic object with homogeneous structure and fine grains. The resulting glass ceramic is generally pore-free.

For the crystallization (crystal nucleation), suitable crystallization agents such as $TiO_2$, $ZrO_2$, $HfO_2$ or other known components can typically be used, whereby the overall volume of the crystallization agents is at most 5 weight-%, such as at most 3 weight-% or at most 2 weight-%, related to the total volume of the glass composition, The glass ceramic can, for example, be a silicate, aluminosilicate, or fluorosilicate glass ceramic. In the glass ceramic, the predominant crystal phase may be selected from the group consisting of lithium silicate, enstatite, wollastonite, filled P-quartz, P-spodumene, cordierite, mullite, potassium richterite, canasite, fixed spinel solution and quartz.

The glass ceramic according to the present invention can be transparent. As already described for the glass, it can have a multifunctional surface, according to one embodiment of the invention comprising durable antimicrobial, antireflective, anti-fingerprint properties, if required, together with chemical prestressing or according to an additional embodiment of the invention comprising antimicrobial and antireflective functions, whereby the substrate is chemically prestressed.

The glass ceramic can have a crystalline phase of at least 30 vol.-%.

The thickness of the glass ceramic can be less than 20 mm, such as less than 15 mm, less than 10 mm, less than 5 mm, less than 3 mm, less than 1 mm, less than 0.7 mm, less than 0.5 mm or less than 0.1 mm.

In one exemplary embodiment, the substrate is a glass ceramic consisting of ceramized aluminosilicate glass or lithium-aluminosilicate glass.

A glass ceramic or a ceramizable glass with the following composition of the starting glass can be used (in weight-%):

| $Li_2O$ | 3.2-5.0 |
| $Na_2O$ | 0-1.5 |
| $K_2O$ | 0-1.5 |
| sum $Na_2O + K_2O$ | 0.2-2.0 |
| MgO | 0.1-2.2 |
| CaO | 0-1.5 |
| SrO | 0-1.5 |
| BaO | 0-2.5 |
| ZnO | 0-1.5 |
| $Al_2O_3$ | 19-25 |
| $SiO_2$ | 55-69 |
| $TiO_2$ | 1.0-5.0 |
| $ZrO_2$ | 1.0-2.5 |
| $SnO_2$ | 0-1.0 |
| Sum $TiO_2 + ZrO_2 + SnO_2$ | 2.5-5.0 |
| $P_2O_5$ | 0-3.0. |

In another embodiment, a glass ceramic or a ceramizable glass with the following composition of the starting glass can be used (in weight-%):

| $Li_2O$ | 3-5 |
| $Na_2O$ | 0-1.5 |
| $K_2O$ | 0-1.5 |
| Sum $Na_2O + K_2O$ | 0.2-2 |
| MgO | 0.1-2.5 |
| CaO | 0-2 |
| SrO | 0-2 |
| BaO | 0-3 |
| ZnO | 0-1.5 |
| $Al_2O_3$ | 15-25 |
| $SiO_2$ | 50-75 |
| $TiO_2$ | 1-5 |
| $ZrO_2$ | 1-2.5 |
| $SnO_2$ | 0-1.0 |
| Sum $TiO_2 + ZrO_2 + SnO_2$ | 2.5-5 |
| $P_2O_5$ | 0-3.0. |

In another embodiment, a glass ceramic or a ceramizable glass with the following composition of the starting glass can be used (in weight-%):

| $Li_2O$ | 3-4.5 |
| $Na_2O$ | 0-1.5 |
| $K_2O$ | 0-1.5 |
| Sum $Na_2O + K_2O$ | 0.2-2 |
| MgO | 0-2 |
| CaO | 0-1.5 |
| SrO | 0-1.5 |
| BaO | 0-2.5 |
| ZnO | 0-2.5 |
| $B_2O_3$ | 0-1 |
| $Al_2O_3$ | 19-25 |
| $SiO_2$ | 55-69 |
| $TiO_2$ | 1.4-2.7 |
| $ZrO_2$ | 1.3-2.5 |
| $SnO_2$ | 0-0.4 |
| Sum $TiO_2 + SnO_2$ | less than 2.7 |
| $P_2O_5$ | 0-3 |
| Sum $ZrO_2 + 0.87 (TiO_2 + SnO_2)$ | 3.6-4.3. |

The glass ceramic can contain high quartz mixed crystals or keatite mixed crystals as the predominant crystals phase. The crystal size can be less than 70 nm, such as less or equal to 50 nm or less than or equal to 10 nm.

The glass- or glass ceramic surface can be polished, provided with a texture or a pattern, for example, by acid/alkali etching, depending on the required surface properties in order to fulfill the desired application prerequisites, such as good tactile properties.

The glass or glass ceramic substrates formed in accordance with the present invention can be used wherever characteristic combinations in the form of antireflection behavior, antimicrobial properties and, optionally, increased strength and scratch resistance, as well as possibly anti-fingerprint properties, are useful and/or necessary.

The glass or glass ceramic substrates formed in accordance with the present invention with their multifunctional properties can be used, for example, for all types of display applications such as display applications with touch screen function as single-, dual- or multi-touch displays, 3D displays or flexible displays. The substrates for prevention of disturbing or contrast-reducing reflections can, for example, also be used as substrates for all types of interactive input elements that are equipped with touch function, such as with resistive, capacitive, optical touch technology, acting by infrared or surface acoustic wave. Particularly in this field, the provision of antimicrobial properties is especially advantageous, since one or multiple users are repeatedly in direct contact with the substrate. The chemically prestressed substrate possesses greater strength and is more scratch resistant and can therefore be especially useful in this field.

Systems that work with light coupling, such as infrared or optically effective touch technologies, react sensitively to the presence of dirt and deposits on the touch surface, since additional reflections can occur as a result of deposits. It is therefore useful if an additional AF coating is provided in this area of the substrate.

Other applications for the prevention of disturbing or contrast reducing reflections with simultaneously durable antimicrobial properties and possible anti-fingerprint properties are, for examples, panes for interior and exterior use, such as shop windows, glazing of pictures, display cases, counters or refrigeration units, decorative glass elements, in particular in stressed areas with higher contamination risk such as kitchens, baths or laboratories, or also covers for solar modules.

Fields of application are also found in the household, in particular in kitchens, baths, components on/in the refrigerator, components in/on the range, in particular on cooktops and the like.

It can possibly be useful if, in addition to AR and AM properties, AF properties with long-term stability are present. In particular, decorative elements that are printed on the backside of the glass or glass ceramic, or that have a mirroring coating, benefit from an AF coating. These elements that are used, for example, on ranges as input panels, or in other kitchen appliances continuously come into contact during use with fingerprints or fatty substances. In these cases, the surface very quickly becomes unsightly and unhygienic. The AF coating improves the visual appearance and is easy to clean. The simultaneous provision of antimicrobial properties protects the user from germs when touching the substrates.

The glass or glass ceramic substrates can also be used in the medical field, in hospitals, medical practices or pharmacies and generally in the pharmaceutical field where it is of considerable significance that the occurrence of germs is already prevented on surfaces such as shelving, containers, panes and the like.

The glass or glass ceramic substrates can also be used in glazing of all types, such as in panes in the interior and exterior regions, such as shop windows, glazing of pictures, show cases, counters, windows, such as protective windows, fire resistant windows, vehicle windows, train windows, aircraft windows, insulating glass doors for cabinets, display and advertising boards, picture frames, architectural glass, for example for use in an exhibition, generally for the protection or art work or displayed objects.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplification set out herein illustrate embodiments of the invention and such exemplifications are not to be construed as limiting the scope of the invention in any manner.

DETAILED DESCRIPTION OF THE INVENTION

Figure 1:
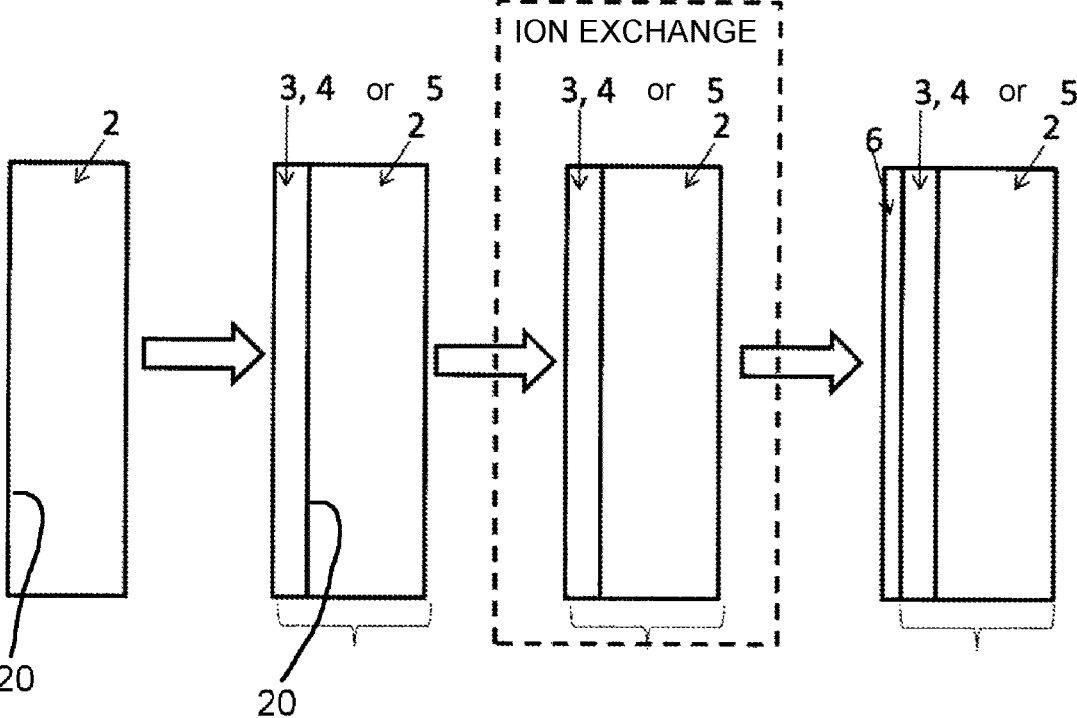
FIG. 1 is a schematic illustration of one embodiment of a method in accordance with the present invention.

FIG. 1 schematically illustrates one exemplary embodiment of a method according to the present invention. Here, a glass or glass ceramic substrate 2 is provided with a surface 20 -which first of all is cleaned if necessary—onto which an antireflective coating is applied. Depending on the specific embodiment, the coating may also be applied on both surfaces (not illustrated) of the glass or glass ceramic substrate 2. The antireflective coating can be an arbitrary coating with antireflective properties. It may, for example, consist of one layer, at least 2 layers with alternating high and low refractive index, or at least 3 layers with alternating medium, high and low refractive index. In the illustrated examples, the antireflective coating is composed of one individual layer 5 (FIG. 4) or of at least 2 layers 3 and 4 (FIGS. 2 and 3) with high and low refractive index, wherein the outer or top layer 31, 41, 5 of the layer package has a low refractive index. According to one embodiment, layer 31, 41, 5 can be an adhesion promoting layer. The adhesion promoting layer can be a mixed oxide layer, such as a silicon mixed oxide layer.

The glass or glass ceramic substrate 2 that is provided with the antireflective coating is subjected to an ion exchange. Herein provision is made in accordance with one of the exemplary embodiments for either only antimicrobial properties or antimicrobial properties and chemical pre-stressing. Metal salts with antimicrobial effect are, for example, silver-, copper-, cadmium-, zinc-, iron-, silver-, cobalt-, cerium-, antimony-, selenium-, chromium-, magne-sium- and nickel salts. For chemical prestressing, any suit-able compounds can be used. Conventionally, potassium-, rubidium- and/or cesium salts are used. Provision of glass or glass substrate 2 with antimicrobial properties and chemical prestressing can be performed in one or two steps. If this is to be performed in one step, the metal salts that are suitable for chemical prestressing and the antimicrobial effective metal salts are mixed together in a salt bath and glass or glass ceramic substrate 2 is dipped into the salt bath. If this process is to be performed in two steps, then chemical prestressing can occur in a first step in a first salt bath and provision of the antimicrobial properties can occur only in a second step in a second salt bath. The second salt bath can contain a mixture of potassium-, rubidium- and/or cesium salt with one or several metal salts with antimicrobial effect. The ion exchange is performed through the antireflective coating, so that the entire substrate with the layer, or layers thereupon, is captured (this is expressed with the bracket in FIG. 1).

Figure 2:
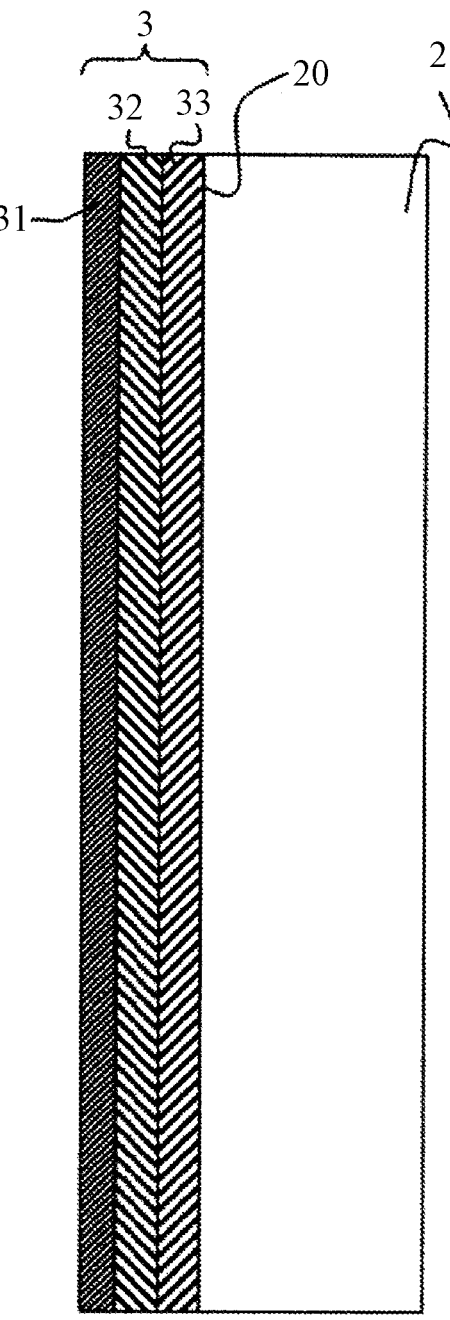
FIG. 2 is a schematic illustration of an embodiment of a glass or glass ceramic substrate with antireflective coating in the form of 3 layers formed in accordance with the present invention.

Following the ion exchange process or processes, an anti-fingerprint coating 6 can be applied to coated glass or glass ceramic substrate 2 that is equipped with antimicrobial properties and is chemically prestressed, if required. FIG. 2 is a schematic illustration of one exemplary embodiment of a glass or glass ceramic substrate 2 formed in accordance with the present invention with an antireflective coating in the form of 3 layers. Layer 33 has a medium refractive index (M-layer), layer 32 has a high refractive index (T-layer) and layer 31 has a low refractive index (S-layer). Layer 31 can be an adhesion promoting layer. Prior to the application of the antireflective coating, it can be useful to clean surface 20 of substrate 2. Glass or glass substrate 2 in the illustrated examples has antimicrobial properties and is chemically prestressed.

The production of such antireflective coating is explained in further detail herein with reference to the examples.

Figure 3:
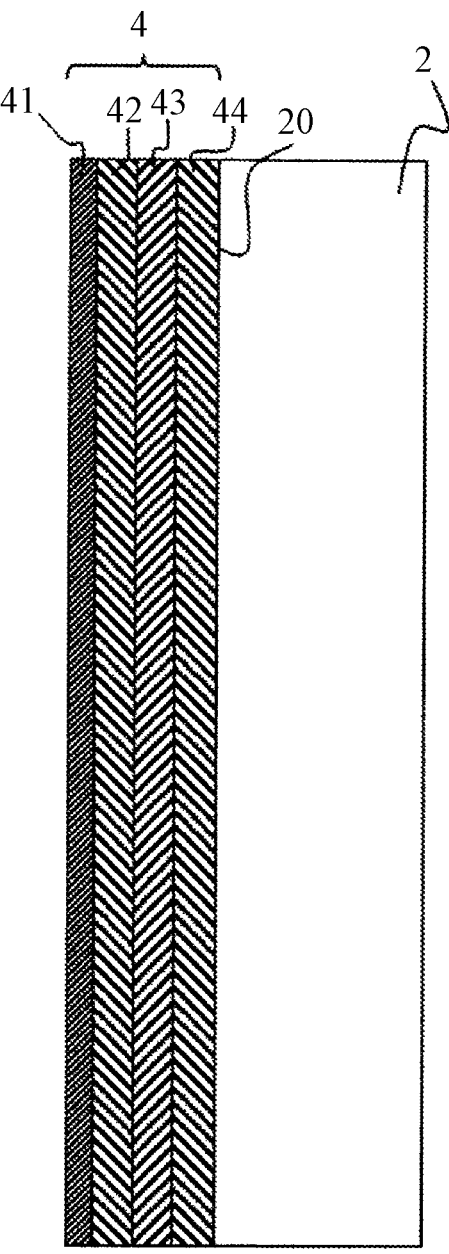
FIG. 3 is a schematic illustration of an embodiment of a glass or glass ceramic substrate with antireflective coating in the form of 4 layers formed in accordance with the present invention.

FIG. 3 is a schematic illustration of an additional embodi-ment of a glass or glass ceramic substrate 2 with an antireflective coating in the form of 4 layers (41, 42, 43, 44). The 4 layers have alternating high and low refractive indexes and together form the antireflective coating. Top layer 41 can be an adhesion promoting layer. In the illustrated example, glass or glass ceramic substrate 2 with coating 4 has antimicrobial properties and is chemically prestressed.

Figure 4:
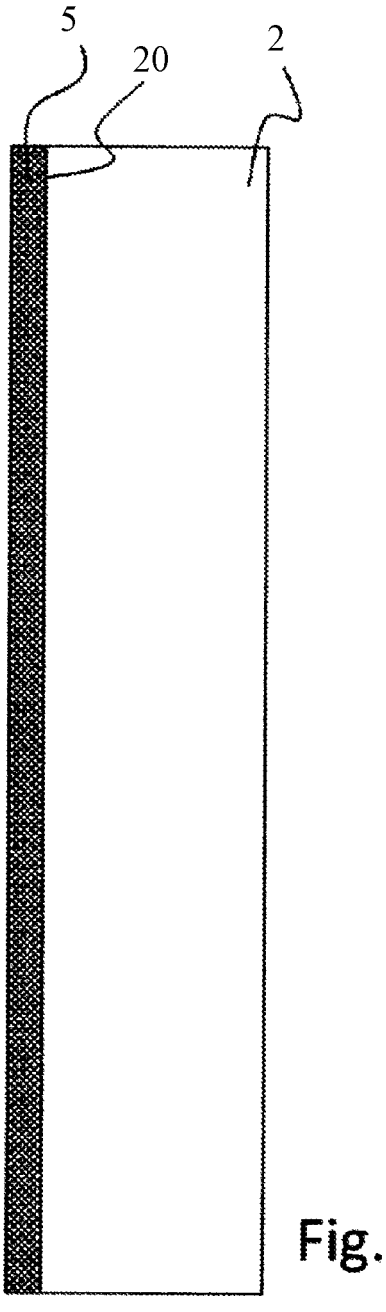
FIG. 4 is a schematic illustration of an embodiment of a glass or glass ceramic substrate with an antireflective coating in the form of a single layer which is an adhesion promoting layer formed in accordance with the present invention.

FIG. 4 is a schematic illustration of another embodiment of a glass or glass ceramic substrate 2 formed in accordance with the present invention with antireflective coating in the form of a single layer 5. This layer can be an adhesion promoting layer. Glass or glass ceramic substrate with the single layer has antimicrobial properties in the illustrated example and is chemically prestressed. Production of such a substrate is described further herein.

FIGS. 5 to 10 are individually discussed with the examples.

The present invention offers a special combination of characteristics that are simultaneously and durably inte-grated into a glass or glass ceramic substrate. The glass or glass ceramic substrates formed in accordance with the present invention, with durable multifunctional surface properties comprise antimicrobial, antireflective and anti-fingerprint functions, or a combination of antimicrobial, antireflective and anti-fingerprint functions, whereby the substrate is chemically prestressed, or a combination of antimicrobial and antireflective functions, whereby the sub-strate is chemically prestressed. A method to produce such a substrate is also an embodiment of the present invention.

The present invention provides characteristic combina-tions that, in this manner, have not been known previously in the art, wherein however each individual property or function is not negatively influenced by an additional prop-erty or function, but which instead complement each other and wherein each property is available to the full extent.

It was found that with simultaneous antimicrobial provi-sion and chemical prestressing, values for the compressive stress (CS) of the surface and the depth of the compressive stress layer DoL (depth of ion exchanged layer) are main-tained which are in the same range as for glasses or glass ceramics that were chemically prestressed through ion exchange, without providing them simultaneously with anti-microbial properties.

The presence of an AF coating has no negative influence upon the release of the ions from the glass or glass ceramic surface that provide an antimicrobial effect, so that the antimicrobial properties can develop fully and uninhibited. The application of an AF layer onto an AR coating moreover leads to an improvement of the abrasion resistance of the entire coating system.

The glass and glass ceramic substrates formed according to the present invention can be used everywhere where the characteristics combination in the form of high strength, antireflective behavior and antimicrobial properties as well as anti-fingerprint properties, if required, are useful and/or necessary.

The glass or glass ceramic substrate formed in accordance with the present invention can be used, for example, as cover glasses for all forms of touch screens of electronic devices and many devices in the home or in the industrial field, for example for mobile phones, smart phones, tablet-PCs, note-book PCs, TVs, ATMs, ticket machines and also for control-, information- and/or operating boards or windows in any possible shape and size as used for example in motor vehicles, hospitals, museums, shops, home building and transportation.

The substrates formed according to the present invention can be used in applications where many functions are integrated together, for example in touch screens of smart phones or tablet PCs. For this purpose, the substrates are chemically prestressed, have an AR and AF coating and possess antimicrobial properties: In this case the glass substrate according to the invention can be chemically prestressed so that the very thin glass substrates that are used in touch screens have a sufficiently high mechanical strength. In addition to avoiding disturbing or contrast reducing reflections, the AR coating provides the possibility of energy savings since, due to a reduction in the reflection at the glass/air interface, the display module can be operated with reduced brightness. The antimicrobial feature of the glass surface protects the user who is continuously in direct contact with the glass surface from bacteria that are present on the surface.

Finally, the anti-fingerprint properties of the glass surface are very useful, because the appearance of the glass is improved and the screen is easier to clean. The described functions can be provided, in particular, with long-term durability.

The glass or glass ceramic substrates formed according to the present invention therefore, provide the surface with all functions in a durable manner, so that current industrial standards are met. The exemplary methods according to the present invention are suitable for mass production.

The present invention is explained below in further detail with reference to the examples, without being limited thereto:

Example 1

Glass Substrate: Soda-Lime Floated Glass
A carefully cleaned 100×200 mm soda-lime float glass was coated with an antireflective coating that was composed of a three-layer structure as illustrated in FIG. 2. The antireflective coating consisted of three layers with the following structure: glass substrate (2)+M-layer (33)+T-layer (32)+S-layer (31). S-layer (31) was at the same time an adhesion promoting layer. The three layers were applied onto the glass by dip coating.

The solutions for the three layers were produced as follows:
S-Layer:
Pre-Solution
A mixture of 60 ml TEOS and 125 ml ethanol was stirred for 15 minutes. Then, 30 ml distilled water and 12 ml 1 N nitric acid were added. After stirring for 5 minutes the solution was diluted with 675 ml ethanol.
(This Pre-Solution was Used for the M-Layer)
Mixed Oxide Solution:
In order to achieve the adhesion promoting layer properties, 10.9 g $Al(NO_3)_3 \cdot 9H_2O$, dissolved in 95 ml ethanol, and 5 ml acetyl-acetonide, was added after 24 hours to the pre-solution.
T-Layer:
68 ml titanium-n-butoxide, 918 ml ethanol (absolute), 5 ml acetylacetone and 9 ml ethyl-butyl-acetate were added and stirred for 2 hours.
M-Layer:
The coating solutions for the production of the M-layer with a medium refractive index were produced by mixing the S-pre-solution and the T-solution. The M-layer solution comprises a mixture of S- and T-solutions at a ratio to the weight-% of the oxides of 75:25.

The individual layers of example 1 were applied in separate dipping steps. The glass material was dipped into the dipping solution. Then it was pulled out at a rate of 6 mm/sec., whereby the moisture content of the ambient atmosphere was between 5 g/m³ and 12 g/m³, such as 8 g/m³. The solvent was then evaporated then at 90 to 100° C. The coated layer was then hardened at a temperature of 450° C. for 20 minutes.

The sample provided with the AR coating in the Sol-Gel method was subsequently dipped into a $KNO_3$ salt bath that contained 0.01 weight-% $AgNO_3$ and was treated for one hour at 430° C.

Then, the ion-exchanged AR coated sample was coated on one side with an AF coating by a liquid printing technology. AF coating solutions are products that are based on polyfluoro-polyethers known under the tradename "Fluorolink® PFPE", for example "Fluorolink® S10" by Solvay Solexis or "Optool DSX™" or "Optool™ AES4-E" by Daikin Industries Ltd.

The glass substrate thus produced according to example 1 has an AR coating, is chemically prestressed, possesses antimicrobial properties and has an AF coating.

Figure 5:
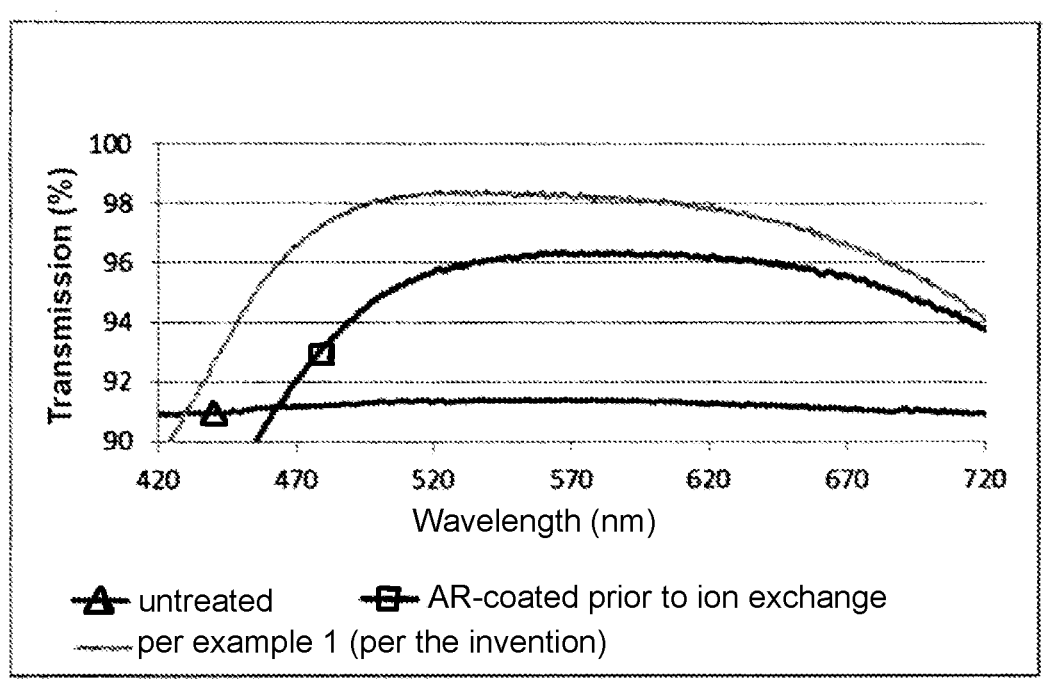
FIG. 5 is an illustration of the comparison of the various transmissions (in %), applied against the wavelength (in nm) of an untreated glass substrate, an antireflective coated glass substrate prior to ion exchange, as well as the glass substrate produced in accordance with one embodiment of a method of the present invention.

For comparison purposes, the measured transmissions of the uncoated soda-lime substrate, the AR coated substrate before the ion exchange and the substrate that was produced according to example 1 are illustrated in FIG. 5.

FIG. 5 shows a clear increase in the transmission of the glass substrate formed in accordance with the present invention that was maintained despite the various functionalities of the glass surface.

The compressive stress (CS) of the obtained glass substrate according to example 1 was 332 MPa and the DoL (depth of ion exchanged layer) was 5.3 μm.

The antimicrobial effectiveness of the glass substrate according to example 1 on its AF coated surface was >99.9% against *E. coli* and also *S. aureus*.

The water contact angle of the AF coated surface of the glass substrate from example 1 was 112° C. The resistance of the glass substrate was examined in the neutral salt spray test. After the glass substrate was subjected for 10 weeks to water and sodium chloride at 35° C., the measured water contact angle was still 105°. This confirms that the durability of the applied coating on the glass substrate is very high.

Example 2

Glass Substrate: Aluminosilicate Glass
A carefully cleaned 100×60×0.5 mm aluminosilicate glass was coated with an antireflective coating that was a single-layer structure as illustrated in FIG. 4. The single AR layer was at the same time an adhesion promoting layer.
The solution for the single layer was produced as follows:
100 ml TEOS was mixed with 200 ml ethyl alcohol and 15 ml 0.1 N HCL. The mixture was stirred for 3 hours at 40° C. The solution was then diluted with 300 ml ethyl alcohol and 16 g $Al(NO_3)_3 \cdot 9H_2O$ was also added and stirring was continued for an additional half hour. After maturing the solution for 24 hours at room temperature, the solution was used as dip solution.

The substrate glass was coated with the aforementioned solution on both sides in a dip coating process. The removal speed of the substrate from the liquid was 9 mm/min. The fresh coating was preheated for 2 minutes at 200° C. and the coated glass substrate was then tempered at 450° C. for 1 hour.

The coated glass substrate was then dipped into a salt bath for the ion exchange process that was conducted for 4 hours at a temperature of 430° C. The molten salt in the salt bath was $KNO_3$, mixed with 0.02 weight-% $AgNO_3$.

After the ion exchange the glass substrate was cleaned and an AF coating was applied by a conventional spray coating process.

The glass substrate produced according to example 2 has thus an AR coating, is chemically prestressed, possesses antimicrobial properties and has an AF coating.

Figure 6:
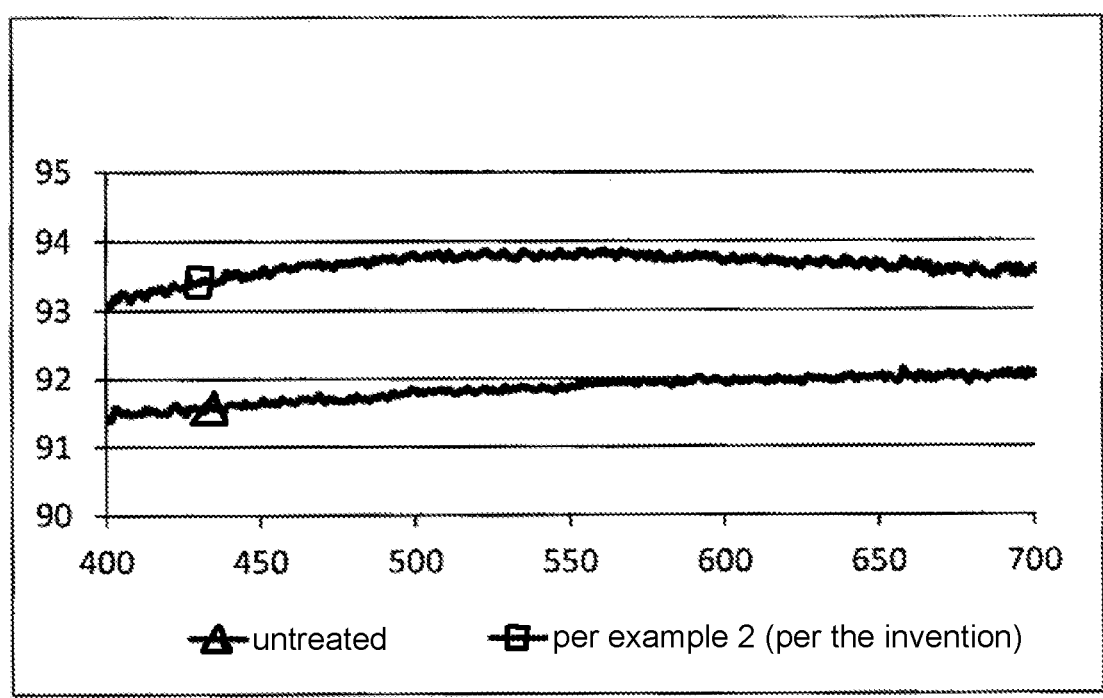
FIG. 6 is an illustration for comparison of the various transmissions (in %), applied against the wavelength (in nm) of an untreated glass substrate, as well as a glass substrate produced in accordance with another embodiment of a method of the present invention.

The transmission of the untreated glass substrate in contrast to the glass substrate from example 2 is illustrated in FIG. 6.

FIG. 6 shows a high transmission of the glass substrate that was produced according to example 2 in contrast to the untreated glass substrate.

The compressive stress (CS) of the glass substrate according to example 2 was 840 MPa and the DoL was 35 µm.

The antimicrobial effectiveness of example 2 on its AF coated surface was >99.9% against *E. coli* and 99.5% against *S. aureus*.

The water contact angle on the AF coated surface of example 2 was 115°.

Example 3

Glass substrate: a glass with the following composition:

| Composition | Weight-% |
| --- | --- |
| $SiO_2$ | 58.1 |
| $Al_2O_3$ | 19.7 |
| $Na_2O$ | 8.2 |
| $K_2O$ | 2.5 |
| MgO | 1.9 |
| $B_2O_3$ | 9.6 |

A carefully cleaned 100×200×3 mm glass of above composition was coated with an antireflective coating consisting of three layers according to FIG. 2. The antireflective coating consisted of three layers with the following structure: glass substrate (2)+M-layer (33)+T-layer (32)+S-layer (31). The S-layer was at the same time an adhesion promoting layer. The three layers were applied onto the glass by means of dip coating.

The solutions for the three layers were produced as follows:

S-Layer:

Pre-Solution

A mixture of 60 ml TEOS and 125 ml ethanol was stirred for 15 minutes. Then, 30 ml distilled water and 12 ml 1 N nitric acid were added. After stirring for 10 minutes the solution was diluted with 750 ml ethanol. (This pre-solution was used for the M-layer)

Mixed Oxide Solution:

In order to achieve the adhesion promoting layer properties, 10.9 g $Al(NO_3)_3 \cdot 9H_2O$, dissolved in 95 ml ethanol and 5 ml acetyl-acetonate, was added after 24 hours to the pre-solution.

T-Layer:

109 g amorphous $TiO_2$ powder was added into the solvent mixture consisting of 802 g ethanol and 89 g 1.5-pentanediol. The synthesis of the $TiO_2$ powder was as follows: 1 mol titanium tetra-ethylate was mixed with 1 mol acetyl-acetone and was then hydrolyzed with 5 mol $H_2O$. After removal of the solvent, the powder was dried for 5 hours at 125° C. The amorphous powder had a $TiO_2$ content of approximately 58 weight-%.

M-Layer:

The coating solutions to produce the M-layer with a medium refractive index were produced by mixing the S-pre-solution and the T-solution. The M-layer solution can comprise a mixture of S- and T-solution at a weight ratio of the oxides of 65:35.

Subsequently, the glass substrate was then dipped into a salt bath to perform the ion exchange process that was conducted for 6 hours at a temperature of 420° C. The molten salt in the salt bath was $KNO_3$, mixed with 0.02 weight--% $AgNO_3$.

After the ion exchange the glass substrate was cleaned and an AF coating was applied by a conventional thermal vacuum deposition method.

The glass substrate thus produced per example 3 has an AR coating, is chemically prestressed, possesses antimicrobial properties and has an AF coating.

The compressive stress (CS) of the glass substrate per example 3 was 712 MPa and the DoL was 30 µm.

The antimicrobial effectiveness of the glass substrate per example 3 on its AF coated surface was >99% against *E. coli* and against *S. aureus*.

The water contact angle on the AF coated surface of example 3 was 115°.

Figure 7:
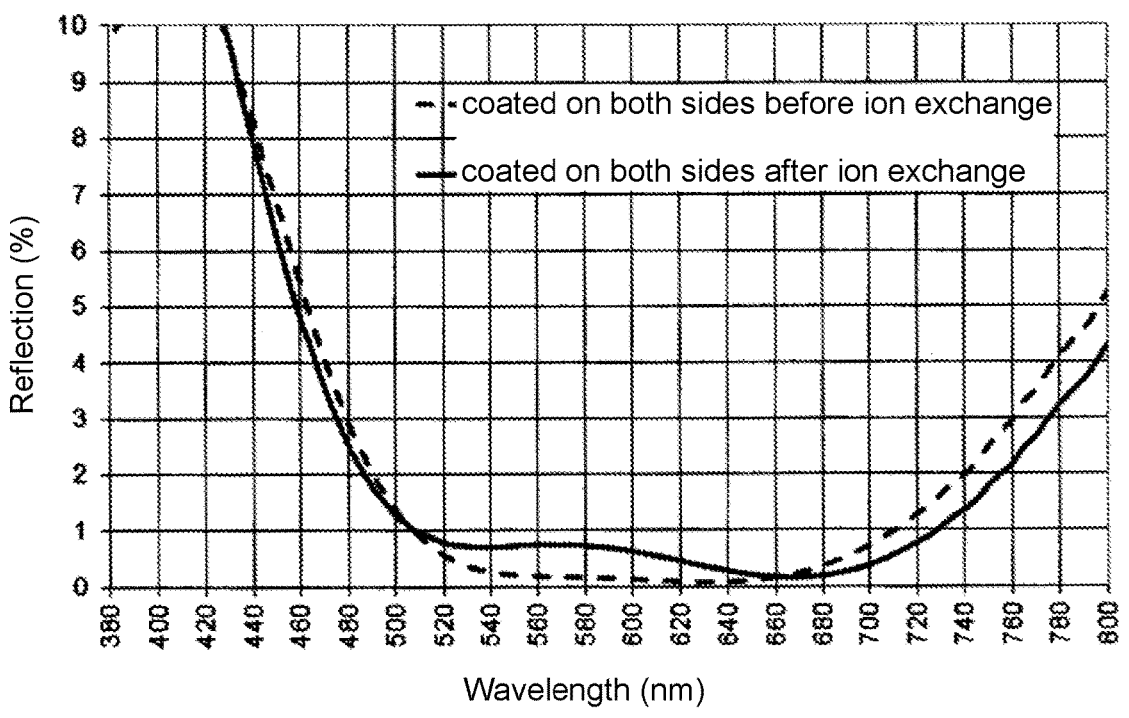
FIG. 7 is an illustration for comparison of the reflections (in %), applied against the wavelength (in nm) of a glass substrate produced according yet another embodiment of a method of the present invention, before and after ion exchange.

The reflections of the glass substrate of example 3 before and after the ion exchange are illustrated in FIG. 7. FIG. 7 shows that the reflection of the glass substrate of example 3 is in fact not negatively influenced by the ion exchange.

Example 4

Glass substrate: soda-lime glass with the following composition:

| Composition | Weight-% |
| --- | --- |
| $SiO_2$ | 70 |
| $TiO_2$ | 0.3 |
| $Na_2O$ | 8.36 |
| $K_2O$ | 8.46 |
| CaO | 5.74 |
| ZnO | 4.53 |
| BaO | 2.11 |
| $Sb_2O_3$ | 0.5 |

A carefully cleaned 100×200 mm soda-lime glass substrate was coated with an antireflective coating that was composed of three layers as illustrated in FIG. 2. The antireflective coating consisted of the following structure: glass substrate (2)+M-layer (33)+T-layer (32)+S-layer (31). S-layer (31) was at the same time an adhesion promoting layer. The three layers were applied onto the glass by dip coating.

The solutions for the three layers were produced as follows:

S-Layer:

A mixture of 45 ml TEOS and 125 ml ethanol was stirred for 15 minutes. Then, 38 ml distilled water and 1.7 g 37% HCl were added. After stirring for 10 minutes, the solution was diluted with 675 ml ethanol. Then, 10 g $SnCl_4 \cdot 6H_2O$, dissolved in 95 ml ethanol and 5 ml acetyl-acetone, was added to the solution.

T-Layer:

70 ml titanium-m-butoxide, 920 ml ethanol (absolute) 5 ml acetyl-acetone and 10 ml ethyl-butyl-acetate were mixed together and stirred for 2 hours.

M-Layer:

The M-layer was produced as described in example 3.

The glass substrate was dipped into a clean $KNO_3$ salt bath for chemical prestressing at a temperature of 420° C. for 8 hours. Then, the glass substrate was subjected to an ion exchange in an additional silver-containing salt bath at a temperature of 430° C. for 0.5 hours. The molten salt in the second salt bath was KNO$_3$, mixed with 0.1 weight-% AgNO$_3$.

After the ion exchange, the glass substrate was cleaned and an AF coating was applied by a conventional liquid printing process.

The glass substrate thus produced per example 4 has an AR coating, is chemically prestressed, possesses antimicrobial properties and has an AF coating.

The compressive stress (CS) of the glass substrate per example 4 was 339 MPa and the DoL was 14 μm.

The antimicrobial effectiveness of the glass substrate per example 4 on its AF coated surface was >99.9% against E. coli and against S. aureus.

The water contact angle on the AF coated surface of the glass substrate of example 4 was 113°.

Figure 8:
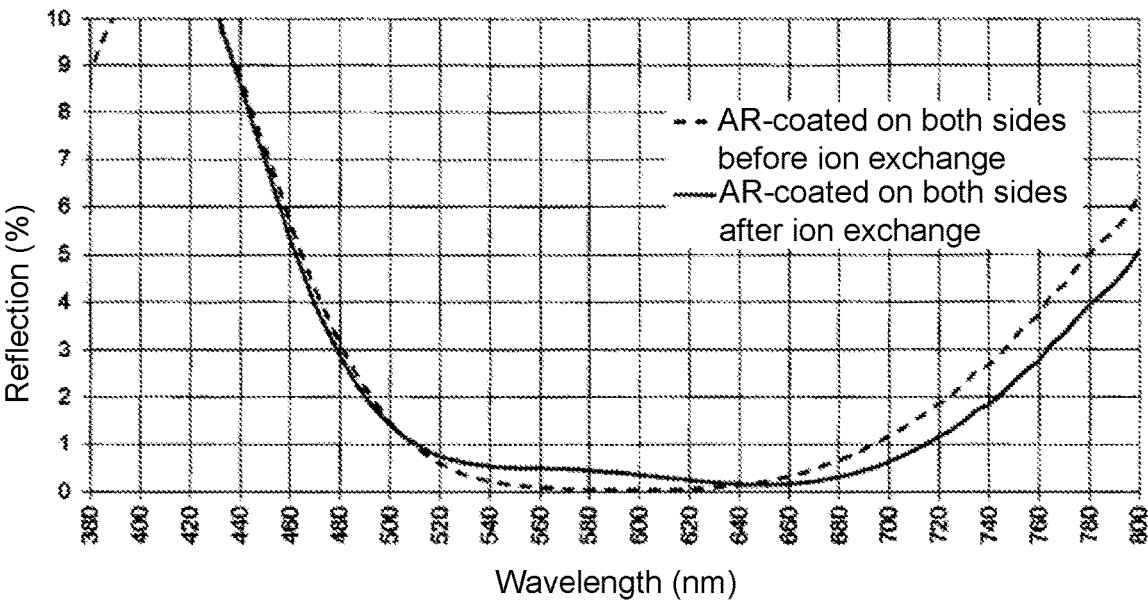
FIG. 8 is an illustration for comparison of the reflections (in %), applied against the wavelength (in nm) of a glass substrate produced according to yet another embodiment of a method of the present invention, before and after ion exchange.

The reflections of the glass substrate produced per example 4 are illustrated in FIG. 8, before and after the ion exchange—performed in two steps. FIG. 8 shows that the reflections of the glass substrate per example 4 before and after the ion exchange show practically no difference, so that the antireflective coating was not negatively influenced by the strengthening process and the provision of the antimicrobial properties.

Example 5

Glass Substrate: Borosilicate Glass without Antimony

| Oxide | Proportion- weight-%] |
|---|---|
| SiO$_2$ | 65 |
| B$_2$O$_3$ | 7 |
| Al$_2$O$_3$ | 3 |
| Na$_2$O | 9 |
| K$_2$O | 8 |
| ZnO | 5 |
| TiO$_2$ | 2 |
| CaO | 1 |

A carefully cleaned 135×70×0.7 mm glass substrate of above composition was coated with an antireflective coating that was composed of a three-layer structure per FIG. 2. The antireflective coating consisted of three layers with the following structure: glass substrate (2)+M-layer (33)+T-layer (32)+S-layer (31). The S-layer (31) was at the same time an adhesion promoting layer. The three layers were applied onto the glass by dip coating.

The solutions for the three layers were produced as follows:
S-Layer:
Pre-Solution
60 ml TEOS were mixed with 125 ml ethanol and 10 ml 0.1 N HCl and were stirred for 3 hours at 40° C. Then, 9.5 g Al(NO$_3$)$_3$, 270 ml ethanol and 50 ml ethyl-acetone were stirred for an additional 30 minutes.
T-Layer:
30 ml Titanium-oxide-isopropoxide was mixed with 36 ml acetic acid and stirred for 1 hour. Then, 400 ml ethanol was added and stirred for 1 hour. Finally, 100 ml acetyl-acetone were added into the solution and stirred for 1 hour.

The glass substrate was then dipped into a salt bath for the ion exchange process that was conducted for 3 hours at a temperature of 410° C. The molten salt in the salt bath was KNO$_3$, mixed with 0.5 weight-% AgNO$_3$.

After the ion exchange, the glass substrate was cleaned and an AF coating was applied by a conventional spray coating process.

The glass substrate thus produced according to example 5 has an AR coating, is chemically prestressed, possesses antimicrobial properties and has an AF coating.

The compressive stress (CS) of the obtained glass substrate according to example 5 was 407 MPa and the DoL was 14 μm.

The antimicrobial effectiveness of the glass substrate according to example 5 on its AF coated surface was >99.9% against E. coli and also against S. aureus.

The water contact angle on the AF coated surface of example 5 was 114°.

Figure 9:
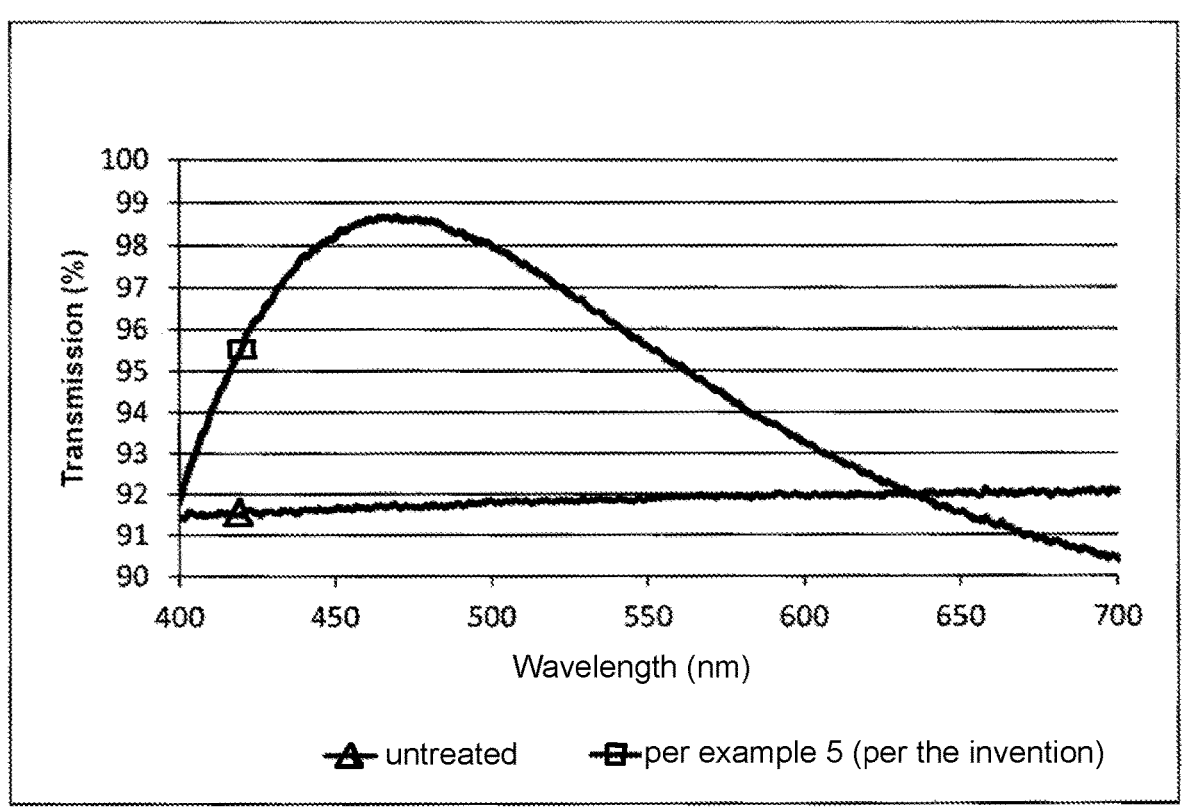
FIG. 9 is an illustration for comparison of the various transmissions (in %), applied against the wavelength (in nm) of an untreated glass substrate, as well as a glass substrate produced in accordance with yet another embodiment of a method of the present invention.

The transmission of the same, but untreated glass substrate in contrast to the glass substrate produced in accordance with example 5 is illustrated in FIG. 9.

FIG. 9 shows that the transmission of the glass substrate according to example 5 is clearly higher and shows a maximum at a wavelength in the rage of 450 and 500 nm, in contrast to an untreated glass substrate:

Example 6

Glass Substrate: Borosilicate Glass with the Following Composition:

| Composition | Weight-% |
|---|---|
| SiO$_2$ | 80.8 |
| Al$_2$O$_3$ | 2.4 |
| B$_2$O$_3$ | 12.7 |
| Na$_2$O | 3.5 |
| K$_2$O | 0.6 |

A carefully cleaned 100×200 mm borosilicate glass was coated with an antireflective coating that was a single-layer structure as illustrated in FIG. 4. The single AR layer was at the same time an adhesion promoting layer.

The solution for the single layers was produced as follows: 56 g of a 30% aqueous SiO$_2$ solution, stabilized with NH$_4$OH, wherein the SiO$_2$ had a medium particle size of 8 nm, were mixed with 120 ml ethanol and 10 ml 0.1 N HCl and were stirred for 3 hours at 40° C. Then, 9.5 g Al(NO$_3$)$_3$, 270 ml ethanol and 50 ml ethyl-acetone were added and stirred for an additional 30 minutes.

The borosilicate glass substrate was coated with the aforementioned solution on both sides in a dip coating process. The fresh coating was preheated for 2 minutes at 200° C. and the coated glass substrate was then tempered at 450° C. for 1 hour.

The coated glass substrate was then dipped into a salt bath for the ion exchange process that was conducted for 4 hours at a temperature of 450° C. The molten salt in the salt bath was KNO$_3$, mixed with 0.05 weight-% AgNO$_3$.

After the ion exchange, the sample was cleaned and an AF coating was applied by a conventional liquid printing coating process.

The glass substrate thus produced according to example 6 has an AR coating, is chemically prestressed, possesses antimicrobial properties and has an AF coating.

The compressive stress (CS) of the obtained glass substrate according to example 6 was 213 MPa and the DoL was 12 μm.

The antimicrobial effectiveness of the glass substrate according to example 6 on its AF coated surface was >99% against E. coli and also against S. aureus.

The water contact angle on the AF coated surface of the glass substrate in example 6 was 112°.

Figure 10:
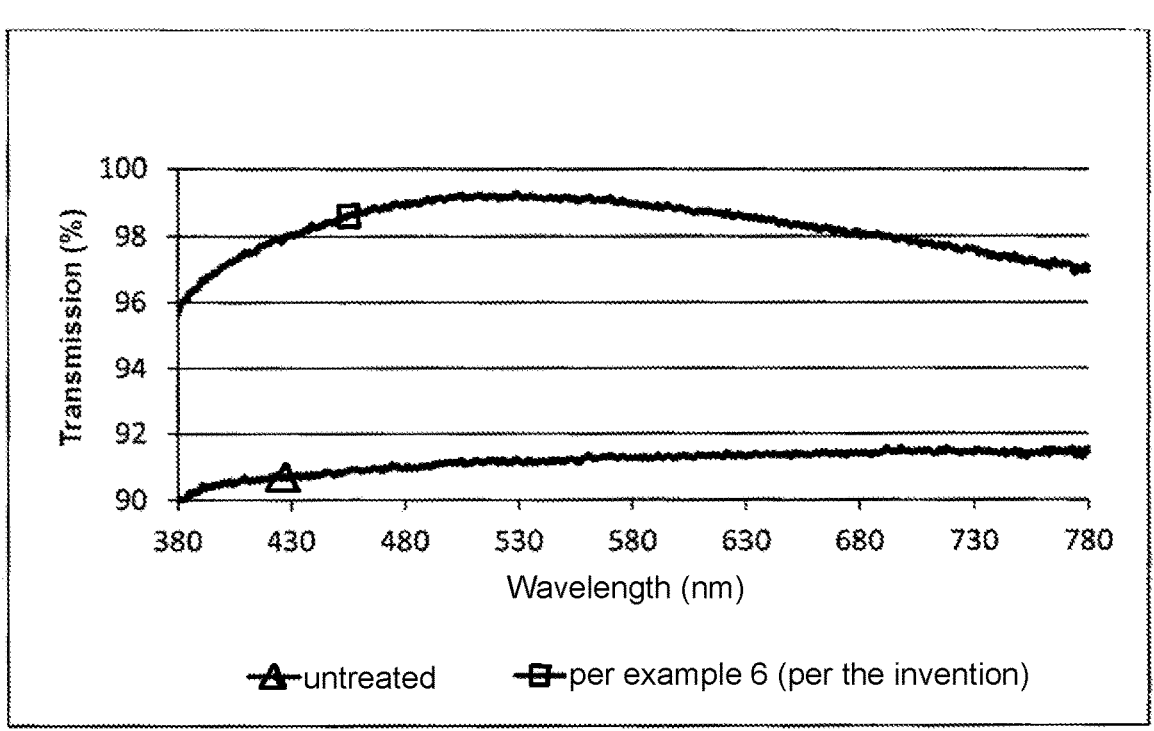
FIG. 10 is an illustration for comparison of the various transmissions (in %), applied against the wavelength (in nm) of an untreated glass substrate, as well as a glass substrate produced in accordance with yet another embodiment of a method of the present invention.

The transmission of the untreated glass substrate in contrast to the glass substrate produced according to example 6 is illustrated in FIG. 10. FIG. 10 shows that the transmission of the glass substrate that was produced according to example 6 is clearly higher than that of the same untreated glass substrate.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention comprises aspects which are disclosed in the sentences below which are part of the description but not claims.

Sentences

1. A coated glass or glass ceramic substrate with resistant multifunctional surface properties, comprising:
    a glass or glass ceramic substrate; and
    a coating including at least one layer applied to said substrate, wherein said coated glass or glass ceramic substrate one of:
        displays a combination of antimicrobial, antireflective, and anti-fingerprint properties;
        displays a combination of antimicrobial, antireflective, and anti-fingerprint properties, wherein said coated glass or glass ceramic substrate is chemically pre-stressed; and
        displays a combination of antimicrobial and antireflective properties, wherein said coated glass or glass ceramic substrate is chemically prestressed.

2. The coated substrate according to sentence 1, wherein said coated glass or glass ceramic substrate incorporates at least one antimicrobially effective metal ion therein, said chemical prestressing is produced through an ion exchange, and said coating includes an antireflective coating including at least one antireflective layer applied to said glass or glass ceramic substrate and an anti-fingerprint coating including at least one anti-fingerprint layer applied to said at least one antireflective layer.

3. The coated substrate according to sentence 1, wherein said coated glass or glass ceramic substrate also displays antiglare properties.

4. The coated substrate according to sentence 2, wherein said antireflective coating consists of one of:
    one antireflective layer which is an adhesion promoting layer;
    at least two antireflective layers with alternating high refractive index and low refractive index layers, wherein an uppermost layer is a low refractive index layer and an adhesion promoting layer; and
    at least three antireflective layers with alternating medium refractive index, high refractive index, and low refractive index layers, wherein an uppermost layer is a low refractive index layer and an adhesion promoting layer.

5. The coated substrate according to sentence 4, wherein said antireflective coating one of:
    consists of one antireflective layer and has a refractive index in the range of 1.22 to 1.44; and includes a plurality of antireflective layers, said uppermost layer having a refractive index in the range of 1.22 to 1.70.

6. The coated substrate according to sentence 4, wherein said antireflective coating comprises a plurality of antireflective layers and said uppermost layer is subdivided into at least one intermediate layer having substantially the same refractive index as one or more layers between said uppermost layer and said substrate.

7. The coated substrate according to sentence 2, wherein said antireflective coating is an incomplete antireflective coating, said incomplete antireflective coating being configured to only form a complete antireflective effect in the spectral range in combination with at least one of an adhesion promoting layer and said at least one anti-finger-print layer.

8. The coated substrate according to sentence 2, wherein said adhesion promoting layer is a mixed oxide layer.

9. The coated substrate according to sentence 8, wherein said mixed oxide layer is a silicon mixed oxide layer comprising an oxide of at least one of: aluminum, zinc, magnesium, phosphorus, cerium, zircon, titanium, cesium, barium, strontium, niobium, tin, boron, and magnesium fluoride and has a thickness greater than 1 nm.

10. The coated substrate according to sentence 1, wherein said substrate is an alkali-aluminosilicate glass comprising the following in weight-%:
    $SiO_2$ 40-75;
    $Al_2O_3$ 10-30;
    $B_2O_3$ 0-20;
    Sum of $Li_2O+Na_2O+K_2O$ 4-30;
    Sum of $MgO+CaO+SrO+BaO+ZnO$ 0-15;
    Sum of $TiO_2+ZrO_2$ 0-15; and
    $P_2O_5$ 0-10.

11. The coated substrate according to sentence 1, wherein said substrate is a borosilicate glass comprising the following in weight-%:
    $SiO_2$ 60-85;
    $Al_2O_3$ 1-10;
    $B_2O_3$ 5-20;
    Sum of $Li_2O+Na_2O+K_2O$ 2-16;
    Sum of $MgO+CaO+SrO+BaO+ZnO$ 0-15;
    Sum of $TiO_2+ZrO_2$ 0-5; and
    $P_2O_5$ 0-2.

12. The coated substrate according to sentence 1, wherein said substrate is a soda-lime glass comprising the following in weight-%:
    $SiO_2$ 40-80;
    $Al_2O_3$ 0-6;
    $B_2O_3$ 0-5;
    Sum of $Li_2O+Na_2O+K_2O$ 5-30;
    Sum of $MgO+CaO+SrO+BaO+ZnO$ 5-30;
    Sum of $TiO_2+ZrO_2$ 0-7; and
    $P_2O_5$ 0-2.

13. The coated substrate according to sentence 1, wherein said substrate is a low alkali aluminosilicate glass comprising the following in weight-%:
    $SiO_2$ 50-75;
    $Al_2O_3$ 7-25;
    $B_2O_3$ 0-20;
    Sum of $Li_2O+Na_2O+K_2O$ 1-4;
    Sum of $MgO+CaO+SrO+BaO+ZnO$ 5-25;
    Sum of $TiO_2+ZrO_2$ 0-10; and
    $P_2O_5$ 0-5.

14. The coated substrate according to sentence 1, wherein said substrate is a lead glass comprising the following in weight-%:

PbO 20-80;
$SiO_2$ 20-60;
$K_2O$ 0-10;
$Na_2O$ 1-10;
BaO 0-20;
SrO 0-20;
$Al_2O_3$ 0-10;
CaO 0-10;
$F_2O_3$ 0-1;
$Sb_2O_3$ 0-1;
ZnO 0-20;
$B_2O_3$ 0-20; and
$ZrO_2$ 0-10.

15. The coated substrate according to sentence 1, wherein said substrate is a glass comprising the following in weight-%:

$SiO_2$ 10-90;
$Al_2O_3$ 0-40;
$B_2O_3$ 0-80;
$Na_2O$ 1-30;
$K_2O$ 0-30;
CoO 0-20;
NiO 0-20;
$Ni_2O_3$ 0-20;
MnO 0-20;
CaO 0-40;
BaO 0-60;
ZnO 0-40;
$ZrO_2$ 0-10;
$MnO_2$ 0-10;
CeO 0-3;
$SnO_2$ 0-2;
$Sb_2O_3$ 0-2;
$TiO_2$ 0-40;
$P_2O_5$ 0-70;
MgO 0-40;
SrO 0-60;
$Li_2O$ 0-30;
$Li_2O+Na_2O+K_2O$ 1-30;
$SiO_2+B_2O_3+P_2O_5$ 10-90;
$Nd_2O_5$ 0-20;
$V_2O_5$ 0-50;
$Bi_2O_3$ 0-50;
$SO_3$ 0-50; and
SnO 0-70,
wherein the content of $SiO_2+P_2O_5+B_2O_3$ is 10-90 is weight-%.

16. The coated substrate according to sentence 1, wherein said substrate is a lithium-aluminum-silicate glass comprising the following in weight-%:

$SiO_2$ 55-69;
$Al_2O_3$ 19-25;
$Li_2O$ 3-5;
Sum of $Na_2O+K_2O$ 0.5-15;
Sum of $MgO+CaO+SrO+BaO$ 0-5;
ZnO 0-4;
$TiO_2$ 0-5;
$ZrO_2$ 0-3;
Sum of $TiO_2+ZrO_2+SnO_2$ 2-6;
$P_2O_5$ 0-8;
F 0-1; and
$B_2O_3$ 0-2.

17. The coated substrate according to sentence 1, wherein said substrate is a glass and contains at least one of a coloring oxide, a rare earth oxide, and a refining agent.

18. The coated substrate according to sentence 1, wherein said substrate is a glass ceramic or ceramizable glass with a starting glass comprising the following in weight-%:

$Li_2O$ 3.2-5.0;
$Na_2O$ 0-1.5;
$K_2O$ 0-1.5;
Sum $Na_2O+K_2O$ 0.2-2.0;
MgO 0.1-2.2;
CaO 0-1.5;
SrO 0-1.5;
BaO 0-2.5;
ZnO 0-1.5;
$Al_2O_3$ 19-25;
$SiO_2$ 55-69;
$TiO_2$ 1.0-5.0;
$ZrO_2$ 1.0-2.5;
$SnO_2$ 0-1.0;
Sum $TiO_2+ZrO_2+SnO_2$ 2.5-5.0; and
$P_2O_5$ 0-3.0.

19. The coated substrate according to sentence 1, wherein said substrate is a glass ceramic or ceramizable glass with a starting glass comprising the following in weight-%:

$Li_2O$ 3-5;
$Na_2O$ 0-1.5;
$K_2O$ 0-1.5;
Sum $Na_2O+K_2O$ 0.2-2;
MgO 0.1-2.5;
CaO 0-2;
SrO 0-2;
BaO 0-3;
ZnO 0-1.5;
$Al_2O_3$ 15-25;
$SiO_2$ 50-75;
$TiO_2$ 1-5;
$ZrO_2$ 1-2.5;
$SnO_2$ 0-1.0;
Sum $TiO_2+ZrO_2+SnO_2$ 2.5-5; and
$P_2O_5$ 0-3.0.

20. The coated substrate according to sentence 1, wherein said substrate is a glass ceramic or ceramizable glass with a starting glass comprising the following in weight-%:

$Li_2O$ 3-4.5;
$Na_2O$ 0-1.5;
$K_2O$ 0-1.5;
Sum $Na_2O+K_2O$ 0.2-2;
MgO 0-2;
CaO 0-1.5;
SrO 0-1.5;
BaO 0-2.5;
ZnO 0-2.5;
$B_2O_3$ 0-1;
$Al_2O_3$ 19-25;
$SiO_2$ 55-69;
$TiO_2$ 1.4-2.7;
$ZrO_2$ 1.3-2.5;
$SnO_2$ 0-0.4;
Sum $TiO_2+SnO_2$ less than 2.7;
$P_2O_5$ 0-3; and
Sum $ZrO_2+0.87 (TiO_2+SnO_2)$ 3.6-4.3.

21. The coated substrate according to sentence 1, wherein said substrate is a glass ceramic containing high quartz mixed crystals or keatite mixed crystals as the predominant crystals phase and a crystal size is less than 70 nm.

22. The coated substrate according to sentence 1, wherein said substrate has a textured surface.

23. The coated substrate according to sentence 1, wherein said substrate is an alumino silicate glass or a glass-ceramic based upon an alumino silicate glass and is chemically prestressed such that said substrate has a compressive stress CS≥600 MPa and a depth of a compressive stress layer DoL≥20 μm.

24. The coated substrate according to sentence 1, wherein said substrate is a soda-lime glass or a glass-ceramic based upon a soda-lime glass and is chemically prestressed such that said substrate has a compressive stress CS≥100 MPa and a depth of a compressive stress layer DOL≥5 μm.

25. The coated substrate according to sentence 1, wherein said coated glass or glass ceramic substrate has an antimicrobial effectiveness of >90% against *E. coli* and *S. aureus.*

26. The coated substrate according to sentence 1, wherein a thickness of said substrate is ≤20 mm.

27. A method of producing a coated glass or glass ceramic substrate with resistant multifunctional surface properties, comprising:

applying an antireflective coating onto a glass or glass ceramic substrate; and immersing said glass or glass ceramic substrate with said antireflective coating in a salt bath such that an ion exchange occurs between said glass or glass ceramic substrate with said antireflective coating and said salt bath, wherein, in said immersing, one of:

said salt bath contains at least one antimicrobial metal salt to provide said glass or glass ceramic substrate with antimicrobial properties;

said salt bath contains at least one of potassium, rubidium, and cesium and at least one antimicrobial metal salt to provide said glass or glass ceramic substrate with antimicrobial properties and chemically prestress said glass or glass ceramic substrate at the same time; and said immersing comprises firstly immersing said glass or glass ceramic substrate in a first salt bath containing at least one of a potassium salt, a rubidium salt, and a cesium salt and secondly immersing said glass or glass ceramic substrate in a second salt bath containing at least one of a potassium salt, a rubidium salt, and a cesium salt and at least one antimicrobial metal salt to provide said glass or glass ceramic substrate with antimicrobial properties and chemically prestress said glass or glass ceramic substrate.

28. The method according to sentence 27, wherein said at least one antimicrobial metal salt includes a metal salt of at least one of: silver, copper, cadmium, zinc, iron, tin, cobalt, cerium, antimony, selenium, chromium, magnesium, and nickel.

29. The method according to sentence 27, wherein said salt bath has a temperature between 35° and 500° C. and said immersing is for a duration between 0.5 and 48 hours.

30. The method according to sentence 27, wherein said first salt bath has a temperature between 35° and 500° C. and said firstly immersing is for a duration between 0.5 and 48 hours, and said second salt bath has a temperature between 40° and 500° C. and said secondly immersing is for a duration between 0.25 and 2 hours.

31. The method according to sentence 27, wherein said at least one antimicrobial metal salt is between 0.01 and 2 weight-% of said salt bath.

32. The method according to sentence 27, wherein said applying comprises liquid phase coating and said glass or glass ceramic substrate is thermally tempered prior to said applying.

33. The method according to sentence 32, wherein said liquid phase coating comprises Sol-Gel coating.

34. The method according to sentence 27, further comprising the step of applying an anti-fingerprint coating onto an antireflective surface of said glass or glass ceramic substrate with said antireflective coating.

35. The method according to sentence 34, wherein said anti-fingerprint coating is applied by at least one of thermal vacuum deposition, sputtering, liquid phase coating, spraying, dip coating, printing, rolling, and spin coating.

What is claimed is:

1. A thin glass ceramic substrate with a thickness that is less than 1 mm, wherein the thin glass ceramic substrate comprises at least one of a lithium aluminosilicate glass ceramic or a ceramized aluminosilicate glass and the thin glass ceramic substrate comprises 3.2-5.0 weight-% $Li_2O$ and 0.2-2.0 weight-% sum $Na_2O$ and $K_2O$, wherein the glass ceramic contains keatite mixed crystals as the predominant crystal phase and the keatite mixed crystals have a crystal size less than 70 nm, wherein the thin glass ceramic substrate comprises greater than 0 weight-% and up to 2 weight-% SrO and/or greater than 0 weight-% and up to 2.5 weight-% ZnO.

2. The thin glass ceramic substrate according to claim 1, wherein the thin glass ceramic substrate further comprises 15-25 weight-% $Al_2O_3$ and 50-75 weight-% $SiO_2$.

3. The thin glass ceramic substrate according to claim 1, wherein in the thin glass ceramic substrate, the following composition of a starting glass is used (in weight-%):

$Li_2O$ 3.2-5.0;
$Na_2O$ 0-1.5;
$K_2O$ 0-1.5;
Sum $Na_2O+K_2O$ 0.2-2.0;
MgO 0.1-2.2;
CaO 0-1.5;
SrO 0-1.5;
BaO 0-2.5;
ZnO 0-1.5;
$Al_2O_3$ 19-25;
$SiO_2$ 55-69;
$TiO_2$ 1.0-5.0;
$ZrO_2$ 1.0-2.5;
$SnO_2$ 0-1.0;
Sum $TiO_2+ZrO_2+SnO_2$ 2.5-5.0; and
$P_2O_5$ 0-3.0.

4. The thin glass ceramic substrate according to claim 1, wherein in the thin glass ceramic substrate or a ceramizable glass, the following composition of a starting glass is used (weight-%):

$Li_2O$ 3.2-4.5;
$Na_2O$ 0-1.5;
$K_2O$ 0-1.5;
Sum $Na_2O+K_2O$ 0.2-2;
MgO 0-2;
CaO 0-1.5;
SrO 0-1.5;
BaO 0-2.5;
ZnO 0-2.5;
$B_2O_3$ 0-1;
$Al_2O_3$ 19-25;
$SiO_2$ 55-69;
$TiO_2$ 1.4-2.7;
$ZrO_2$ 1.3-2.5;
$SnO_2$ 0-0.4;
Sum $TiO_2+SnO_2$ less than 2.7;
$P_2O_5$ 0-3; and
Sum $ZrO_2+0.87$ $(TiO_2+SnO_2)$ 3.6-4.3.

5. The thin glass ceramic substrate according to claim 1, wherein in the thin glass ceramic substrate the following composition of a starting glass is used (in weight-%):

$Li_2O$ 3.2-5;
$Na_2O$ 0-1.5;
$K_2O$ 0-1.5;
Sum $Na_2O+K_2O$ 0.2-2;
MgO 0.1-2.5;
CaO 0-2;
SrO 0-2;
BaO 0-3;
ZnO 0-1.5;
$Al_2O_3$ 15-25;
$SiO_2$ 50-75;
$TiO_2$ 1-5;
$ZrO_2$ 1-2.5;
$SnO_2$ 0-1.0;
Sum $TiO_2+ZrO_2+SnO_2$ 2.5-5; and
$P_2O_5$ 0-3.0.

6. The thin glass ceramic substrate according to claim 1, wherein the thin glass ceramic substrate comprises a glass which is totally or partially crystallized.

7. The thin glass ceramic substrate according to claim 1, wherein the thin glass ceramic substrate comprises an amorphous phase and one or several crystalline phases that are produced through crystallization control.

8. The thin glass ceramic substrate according to claim 1, wherein the thin glass ceramic substrate has a crystalline phase of at least 30 vol-%.

9. The thin glass ceramic substrate according to claim 1, wherein a glass ceramic of the thin glass ceramic substrate is obtained through conversion of a glass by utilizing a thermal treatment.

10. The thin glass ceramic substrate according to claim 9, wherein the glass ceramic is transparent.

11. The thin glass ceramic substrate according to claim 1, further comprising:

a coating including at least one layer applied to said thin glass ceramic substrate to form a coated glass ceramic substrate, wherein said coated glass ceramic substrate displays a combination of antimicrobial and antireflective properties, wherein said coated glass ceramic substrate also satisfies at least one of the following:

said coated glass ceramic substrate also displays anti-fingerprint properties; or said coated glass ceramic substrate is chemically prestressed.

12. The thin glass ceramic substrate according to claim 11, wherein the thin glass ceramic substrate incorporates at least one antimicrobially effective metal ion therein, said thin glass ceramic substrate is chemically prestressed and the chemical prestressing is produced through an ion exchange, and said coating includes an antireflective coating including at least one antireflective layer applied to said thin glass ceramic substrate and an anti-fingerprint coating including at least one anti-fingerprint layer applied to said at least one antireflective layer.

13. The thin glass ceramic substrate according to claim 12, wherein said at least one antireflective layer consists of:

one antireflective layer which is an adhesion promoting layer;

at least two antireflective layers with alternating high refractive index and low refractive index layers, wherein an uppermost layer is a low refractive index layer and an adhesion promoting layer; or at least three antireflective layers with alternating medium refractive index, high refractive index, and low refractive index layers, wherein an uppermost layer is a low refractive index layer and an adhesion promoting layer.

14. The thin glass ceramic substrate according to claim 13, wherein said at least one antireflective layer satisfies one of the following:

said at least one antireflective layer consists of one antireflective layer and has a refractive index in a range of 1.22 to 1.44; or said at least one antireflective layer includes a plurality of antireflective layers, said uppermost layer having a refractive index in the range of 1.22 to 1.70.

15. The thin glass ceramic substrate according to claim 13, wherein said antireflective coating comprises a plurality of antireflective layers and an uppermost layer is subdivided into at least one intermediate layer having the same refractive index as one or more layers between said uppermost layer and said thin glass ceramic substrate.

16. The thin glass ceramic substrate according to claim 13, wherein said adhesion promoting layer is a mixed oxide layer.

17. The thin glass ceramic substrate according to claim 16, wherein said mixed oxide layer is a silicon mixed oxide layer comprising an oxide of at least one of: aluminum, zinc, magnesium, phosphorus, cerium, zircon, titanium, cesium, barium, strontium, niobium, tin, boron, or magnesium fluoride and has a thickness greater than 1 nm.

18. The thin glass ceramic substrate according to claim 12, wherein said at least one antireflective layer is an incomplete antireflective layer, said incomplete antireflective layer being configured to only form a complete antireflective effect in a spectral range in combination with at least one of an adhesion promoting layer or said at least one anti-fingerprint layer.

19. The thin glass ceramic substrate according to claim 11, wherein said coated glass ceramic substrate also displays antiglare properties.

20. The thin glass ceramic substrate according to claim 11, wherein the coated glass ceramic substrate is chemically prestressed and has a transmission of greater than 93% over the wavelength range of 400 nm to 700 nm.

21. A method for producing a thin glass ceramic substrate, the method comprising the following steps:

melting raw materials during a glass producing process at a temperature higher than 1000° C. in order to create a glass melt; and in the glass melt after homogenization at a predetermined temperature after cooling, nucleation and crystallization is performed in order to produce the thin glass ceramic substrate with a homogenous structure with fine grains, wherein the thin glass ceramic substrate has a thickness that is less than 1 mm, wherein the thin glass ceramic substrate comprises at least one of a lithium aluminosilicate glass ceramic or a ceramized aluminosilicate glass and the thin glass ceramic substrate comprises 3.2-5.0 weight-% $Li_2O$ and 0.2-2.0 weight-% sum $Na_2O$ and $K_2O$, wherein the glass ceramic contains keatite mixed crystals as the predominant crystal phase and the keatite mixed crystals have a crystal size less than 70 nm, wherein the thin glass ceramic substrate comprises greater than 0 weight-% and up to 2 weight-% SrO and/or greater than 0 weight-% and up to 2.5 weight-% ZnO.

22. The method according to claim 21, wherein a crystallization agent for crystallization is used, wherein a total amount of crystallization agent is at most 5 weight-% in relation to a total amount of the glass composition.

* * * * *